United States Patent
Ellis

(10) Patent No.: US 10,491,959 B2
(45) Date of Patent: Nov. 26, 2019

(54) ELECTRONIC PROGRAM GUIDE WITH BLACKOUT FEATURES

(71) Applicant: Rovi Guides, Inc., San Jose, CA (US)

(72) Inventor: Michael D. Ellis, Boulder, CO (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 16/049,547

(22) Filed: Jul. 30, 2018

(65) Prior Publication Data

US 2018/0338183 A1    Nov. 22, 2018

Related U.S. Application Data

(63) Continuation of application No. 14/454,534, filed on Aug. 7, 2014, now Pat. No. 10,057,652, which is a
(Continued)

(51) Int. Cl.
| | |
|---|---|
| *H04N 21/482* | (2011.01) |
| *H04N 21/488* | (2011.01) |
| *H04N 5/445* | (2011.01) |
| *H04N 21/472* | (2011.01) |
| *H04N 21/433* | (2011.01) |
| *H04N 21/45* | (2011.01) |
| *H04N 21/458* | (2011.01) |
| *H04N 21/478* | (2011.01) |

(52) U.S. Cl.
CPC ....... *H04N 21/482* (2013.01); *H04N 5/44543* (2013.01); *H04N 21/4334* (2013.01); *H04N 21/4532* (2013.01); *H04N 21/4583* (2013.01); *H04N 21/47202* (2013.01); *H04N 21/47211* (2013.01); *H04N 21/47214* (2013.01); *H04N 21/488* (2013.01); *H04N 21/4826* (2013.01); *H04N 21/47815* (2013.01)

(58) Field of Classification Search
CPC ............ H04N 21/4532; H04N 21/482; H04N 5/44543; H04N 21/4583; H04N 21/47202; H04N 21/47214; H04N 21/4826

See application file for complete search history.

(56) References Cited

U.S. PATENT DOCUMENTS

| | | | | |
|---|---|---|---|---|
| 4,739,510 A | * | 4/1988 | Jeffers | H04H 20/28 348/E7.028 |
| 5,036,537 A | * | 7/1991 | Jeffers | H04N 7/1675 348/E7.056 |

(Continued)

*Primary Examiner* — Jason P Salce
(74) *Attorney, Agent, or Firm* — Haley Guiliano LLP

(57) ABSTRACT

An interactive television program guide for supporting programming blackouts is provided. In some embodiments, the interactive television program guide may unschedule the reminding and recording of blacked-out programs that have been scheduled by a user for reminding or recording. In some embodiments, the interactive television program guide may prevent a user from scheduling blacked-out programs for reminding and recording. In some embodiments, the interactive television program guide may prevent a user from ordering blacked-out pay-per-view programs. In some embodiments, the interactive television program guide may provide blackout information in information displays. In some embodiments, the interactive television program guide may provide replacement media for blacked-out programs.

20 Claims, 37 Drawing Sheets

Related U.S. Application Data continuation of application No. 12/887,009, filed on Sep. 21, 2010, now Pat. No. 8,839,294, which is a continuation of application No. 12/402,979, filed on Mar. 12, 2009, now Pat. No. 7,823,177, which is a continuation of application No. 12/075,834, filed on Mar. 14, 2008, now Pat. No. 7,523,477, which is a continuation of application No. 09/996,346, filed on Nov. 28, 2001, now Pat. No. 7,370,343.

(60) Provisional application No. 60/253,585, filed on Nov. 28, 2000.

(56) References Cited

U.S. PATENT DOCUMENTS

| | | | | |
|---|---|---|---|---|
| 5,619,274 | A * | 4/1997 | Roop | G04G 15/006 |
| | | | | 348/461 |
| 5,973,683 | A * | 10/1999 | Cragun | H04N 7/163 |
| | | | | 348/E7.061 |
| 7,757,252 | B1 * | 7/2010 | Agasse | H04N 5/44543 |
| | | | | 725/41 |
| 2002/0056103 | A1 * | 5/2002 | Gong | H04N 21/23109 |
| | | | | 725/39 |
| 2003/0126594 | A1 * | 7/2003 | Tsuria | H04N 7/165 |
| | | | | 725/25 |
| 2008/0066103 | A1 * | 3/2008 | Ellis | H04N 5/44591 |
| | | | | 725/38 |
| 2008/0168487 | A1 * | 7/2008 | Chow | H04N 7/165 |
| | | | | 725/31 |
| 2011/0041147 | A1 * | 2/2011 | Piepenbrink | H04N 7/17336 |
| | | | | 725/28 |

* cited by examiner

ELECTRONIC PROGRAM GUIDE WITH BLACKOUT FEATURES

CROSS-REFERENCE TO RELATED APPLICATIONS

This application is a continuation of U.S. patent application Ser. No. 14/454,534, filed Aug. 7, 2014 (now allowed), which is a continuation of U.S. patent application Ser. No. 12/887,009, filed Sep. 21, 2010 (now U.S. Pat. No. 8,839, 294), which is a continuation of U.S. patent application Ser. No. 12/402,979, filed Mar. 12, 2009 (now U.S. Pat. No. 7,823,177), which is a continuation of U.S. patent application Ser. No. 12/075,834, filed Mar. 14, 2008 (now U.S. Pat. No. 7,523,477), which is a continuation of U.S. patent application Ser. No. 09/996,346, filed Nov. 28, 2001 (now U.S. Pat. No. 7,370,343), which claims the benefit of U.S. Provisional Patent Application No. 60/253,585, filed Nov. 28, 2000 the disclosures of which are hereby incorporated by reference herein in their entireties.

BACKGROUND OF THE INVENTION

The present invention relates to systems and methods for interactive television applications. More particularly, the present invention relates to systems and methods for providing programming blackout features in interactive television program guides.

Program guides typically provide program listings that indicate the channels and times of scheduled programs. Users may select a program listing to, for example, tune to a program and obtain additional information for the program. Program listings and other information in guide screens of the prior art, however, may not always be accurate because of programming blackouts. A programming blackout occurs when a distribution facility, or other facility, does not broadcast programming at the time it was scheduled to be broadcast.

Three illustrative types of blackouts are bandwidth blackouts, affiliate protection blackouts, and venue protection blackouts. Bandwidth blackouts may occur when a program has larger than typical bandwidth requirements. For example, a sports program may require more bandwidth than a non-sports program due to its fast-action nature. When a sports program is broadcast, bandwidth may be borrowed from another channel in order to satisfy the increased bandwidth requirement of the sports program. Borrowing bandwidth from a channel may prevent the broadcast of a regularly scheduled program in that channel. Thus, a blackout of that regularly scheduled program occurs.

Affiliate protection blackouts may occur when the same program is scheduled to be broadcast on two separate channels, such as a local network affiliate and a national channel. In an attempt to protect the interests of the local network affiliate, the television service provider may black out the commonly scheduled program on the national channel in the locality of the local network affiliate.

Venue protection blackouts may occur, for example, when the provider of a live event wants to protect the venue of the live event by preventing the event from being televised. For example, when a sporting event, or other event, is not sold out, the sports team may prohibit the broadcast of the event in an attempt to increase ticket sales and attendance for the event and for future events. Thus, a programming blackout may occur on the channel scheduled to broadcast the event.

Program guide listings may falsely indicate the availability of unavailable or 'blacked-out' programs because program guide data is typically provided to the program guide in advance of the actual broadcast of a program. Programming blackouts can affect various program guide features. For example, a user may select a television program listing to view a program, unaware that the program has been blacked out. The guide will tune to the channel but some other program or a blank screen will be presented. Some users may find this undesirable. As another example, a user may set a reminder for a program that is later blacked out. When the reminder is shown, the user may attempt to tune to the program for which the reminder was scheduled. The absence of the program may confuse or even frustrate the user who must then return to the guide and search for another program. As yet another example, a user may schedule the recording of a program that is later blacked out. The program guide may attempt to record the blacked-out program, but some other program or a blank screen presented on the channel of the blacked-out program will be recorded instead. Some users may find this undesirable.

When pay-per-view programs are blacked out users may be permitted to order the blacked-out pay-per-view programs. Upon ordering a blacked out program, the user may tune to watch the program only to be presented with another program or a blank screen. This may cause the user uncertainty as to whether or not the ordered program has still charged to the user's account.

It would be desirable therefore to provide an interactive television program guide that includes features for supporting programming blackouts.

SUMMARY OF THE INVENTION

The present invention relates to systems and methods for providing blackout features in interactive television program guides. Illustrative features of various embodiments of the present invention are described, for example, in U.S. Provisional Patent Application No. 60/253,585, filed Nov. 28, 2000, which is hereby incorporated by reference herein in its entirety.

In various embodiments of the present invention, blackout information is provided to an interactive television program guide. This blackout information may be provided with or separate from other program guide data. The blackout information may include, for example, information indicating a blacked-out program, such as the program's unique ID or time and channel information. In some embodiments, blackout information may include blackout flags that identify programs as being blacked-out. In some embodiments, blackout information may be include invalid purchase prices (e.g., a negative purchase price) for blacked-out pay-per-view programs. In some embodiments, blackout information may include the reason for the blackout. The blackout information may also include, for example, a reference to replacement media such as a unique identifier for alternate content, a URL, a channel indicator, or other reference to replacement media. In some embodiments, the blackout information may include the replacement media itself (e.g., video clips, bitmaps, or other such media). In some embodiments, the replacement media may be targeted advertisements. For example, a sports team that has chosen to black out an event may choose to broadcast a team video advertisement in its place. As another example, advertisements targeted to a user's interests (e.g., as determined by a user viewing history maintained by the program guide) may be provided in place of a blacked-out program.

The program guide uses the blackout information to make changes in various program guide features that may be affected by a blackout. For example, the program guide may replace the titles of previously scheduled television programs with a blackout programming notice or indicator. Additional information pertaining to an indicated blackout such as, for example, cable headend contact information, the type of blackout, and previously scheduled program information may be provided to the user in response to a user instructing the guide to provide additional information for a blacked-out program. In some embodiments, the guide may present the user with a list of recommended replacement media.

In some embodiments, the program guide may provide features in connection with the recording of blacked-out programs. For example, the program guide may prevent the recording of a blacked-out program or postpone the recording of a blacked-out program until the program is eventually, if ever, broadcast. As another example, a program guide may automatically record a replacement program when a user has scheduled the recording of a blacked-out program.

Some embodiments may provide blackout features for pay-per-view programs. For example, the program guide may provide replacement media recommendations for blacked-out pay-per-view programs. As another example, the program guide may notify a user (e.g., in an overlay) that the fee for a pay-per-view program that is blacked out subsequent to the user ordering the program will not be charged to the user's account. In yet another example, reminder options and ordering capabilities for blacked-out pay-per-view programs may be disabled. In some embodiments, the program guide may eliminate blacked-out pay-per-view program listings from program guide listing screens (e.g., when invalid purchase prices have been associated with the blacked-out pay-per-view programs) to prevent a user from ordering or setting reminders for blacked-out pay-per-view programs.

BRIEF DESCRIPTION OF THE DRAWINGS

Further features of the invention, its nature and various advantages will become more apparent upon consideration of the following detailed description, taken in conjunction with the accompanying drawings, in which like reference characters refer to like parts throughout, and in which.

DETAILED DESCRIPTION OF THE INVENTION

Systems and methods for providing blackout features in interactive television program guide systems may be based on any suitable hardware platform or topology. Suitable hardware platforms may include, for example, satellite receivers, personal computer televisions (PC/TVs), personal computers (e.g., with television tuner cards), cable set-top boxes, televisions, videocassette recorders (VCRs), a combination of such hardware platforms, or any other suitable hardware platform. Illustrative interactive television program guides are described, for example, in Knee et al. U.S. Pat. No. 5,589,892, Knudson et al. U.S. patent application Ser. No. 09/070,555, filed Apr. 30, 1998, and Knudson et al. U.S. patent application Ser. No. 09/357,941, filed Jul. 16, 1999, which are hereby incorporated by reference herein in their entireties.

Figure 1:
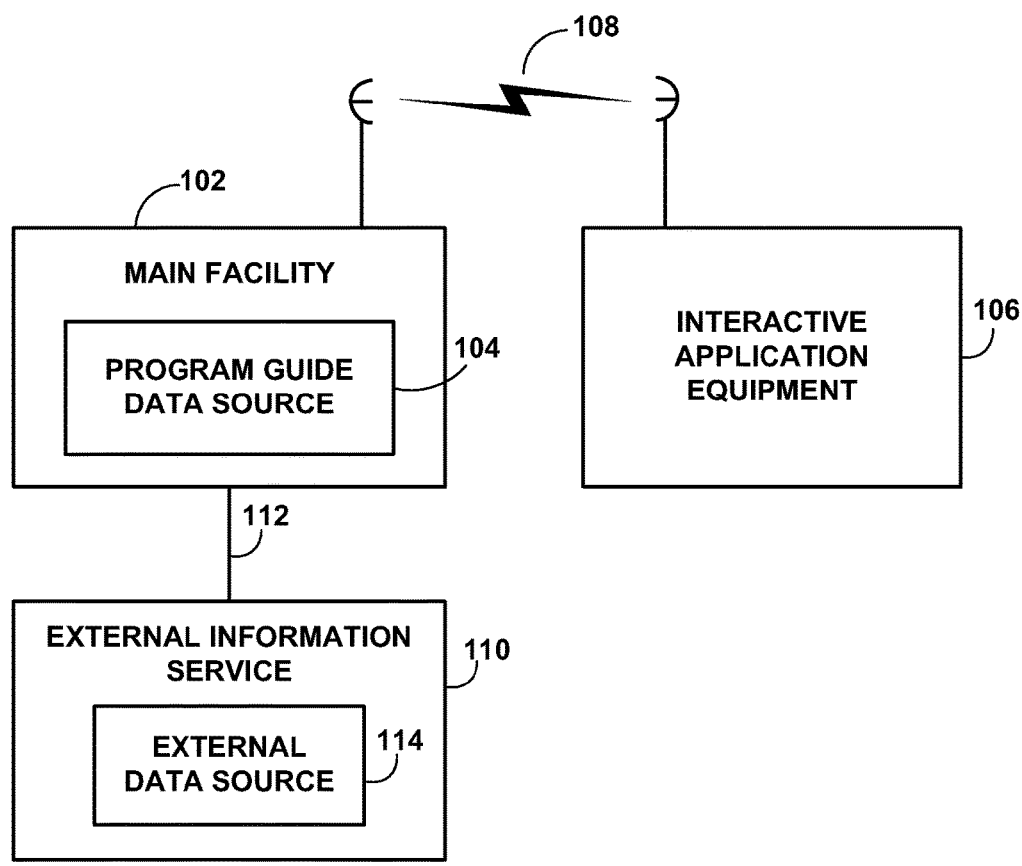
FIG. 1 is an illustrative arrangement for an interactive program guide system that supports blackout features in accordance with one embodiment of the present invention.

An illustrative system 100 in accordance with one embodiment of the present invention is shown in FIG. 1. Main facility 102 may provide programming blackout data and other program guide data from guide data source 104 to interactive application equipment 106 via communications path 108. There may be numerous installations of interactive application equipment 106, although only one is shown in FIG. 1 to avoid over-complicating the drawing. Program guide data source 104 of main facility 102 may be any suitable computer or computer-based system for generating, storing, or obtaining program guide data (e.g., manually from an operator, electronically via a computer network or other connection, or via storage media) and putting the data into electronic form for distribution by main facility 102. In the example of FIG. 1, program guide data source 104 provides blackout data and other program guide data. In other embodiments, blackout data and other program guide data may be provided by separate data sources.

Blackout data may include information that identifies blacked-out programs such as, for example, titles, channels, and times of blacked-out programs, or their unique IDs. As another example, blackout data may include invalid purchase prices (e.g., negative purchase prices) for blacked-out pay-per-view programs. In some embodiments, blackout data may include blackout flags that identify programs as being blacked-out. In some embodiments, blackout data may include the reason for the blackout. The blackout data may also include, for example, a reference to replacement media such as a unique identifier, a URL, a channel indicator, or other reference to replacement media. In some embodiments, the blackout data may include the replacement media (e.g., video clips, bitmaps, or other such media). Other program guide data may include, for example, titles, channels, and times of scheduled programs, descriptions of scheduled programs, pay-per-view program data, on-demand media data, and other application data.

In some embodiments, data sources may be located at facilities separate from main facility 102. For example, external information service 110 may provide data to main facility 102 via communications path 112 for distribution. External information service 110 may be any facility suitable for providing program guide data to main facility 102 over communications path 112. External information service 110 may provide, for example, blackout data, advertisements, sports information, news information, or any other information. External information service 110 may be, for example, a television network or cable system headend. In some embodiments, external information service 110 may provide data relevant to a particular locality, such as a local newspaper that distributes local news information or a weather station that reports local weather data.

External information service 110 may contain external data source 114. External data source 114 may be any suitable computer or computer-based system for generating, storing, or obtaining program guide related data (e.g., manually from an operator, electronically via a computer network or other connection, or via storage media) and putting the data into electronic form for distribution to main facility 102 or other facility.

Multiple external information services 110 and multiple communications paths 112 may provide data to main facility 102. Only one external information service 110 and one communications path 112 have been shown in FIG. 1, however, to avoid over-complicating the drawing. Main facility 102 may transmit data received from external information service 110 to interactive application equipment 106 over communications path 108. In some embodiments, external information service 110 may provide data directly to interactive application equipment 106.

Communication paths 108 and 112 may be satellite communications paths, fiber-optic paths, wired communications paths, coaxial cable paths, radio frequency paths, electromagnetic communications paths, microwave communications paths, Internet paths, or any other suitable wired or wireless communications path or combination of paths. Communications paths 108 and 114 may have sufficient bandwidth to transmit video signals.

Main facility 102 may transmit blackout data and other program guide data to interactive application equipment 106 using any suitable approach. For example, main facility 102 may distribute programming blackout data and other program guide data periodically, continuously, or using any other suitable approach. Program guide data and other data may be distributed discretely as separate files or packets, or may be distributed in a continuous data stream (e.g., using a carousel-based approach).

In some embodiments, main facility 102 may transmit programming blackout data separate from other program guide data. The program guide may update previously received program guide data with the blackout information. In some embodiments, blackout data and program guide data may be provided by main facility 102 using different approaches. For example, main facility 102 may provide blackout information in a continuous data stream (e.g., using a carousel-based approach) while providing other program guide data periodically or using a client-server based approach. Any suitable combination of approaches may be used.

In some embodiments, main facility 102 may, for example, provide blackout data to interactive application equipment 106 as part of schedule localizations. Examples of systems that utilize schedule localizations are described in Borges et al. U.S. Pat. No. 5,760,821, which is hereby incorporated by reference herein in its entirety. Periodic schedule localizations may update program listings and provide blackout data with a suitable frequency (e.g., daily, weekly, continuously, etc.), allowing information from a central facility, such as main facility 102, to be received and processed at local facilities, such as those of interactive application equipment 106. Schedule localizations may be utilized to provide programming blackout information to interactive application equipment 106 when the frequency of schedule localization permits.

Main facility 102 may store reusable interactive application equipment lists. The lists may include identifiers of multiple installations of interactive application equipment 106 that occupy a common locality, region, or coverage area. Main facility 102 may use stored interactive application equipment lists to specify the scope of schedule localization transmissions. For example, main facility 102 may utilize an interactive application list to localize programming blackout data to the installations of interactive application equipment 106 specified by the list. In addition, main facility 102 may create new interactive application equipment lists, in the event that no existing list satisfies the desired scope of a schedule localization transmission. For example, main facility 102 may create new interactive application lists of installations of interactive application equipment 106 that had never been previously localized by the same transmission.

In some embodiments, the way blackout data is provided by main facility 102 or external information service 110 may depend on the nature of the blackout event and the amount of time in advance the blackout is identified. In instances in which a blackout is identified with little, if any, notice, main facility 102 may, for example, separately transmit programming blackout data packets to interactive application equipment 106 to ensure that the blackout data is delivered quickly. In instances in which a blackout is identified with adequate advance notice, main facility 102 may, for example, provide blackout data and other program guide data together to interactive application equipment 106.

Figure 2:
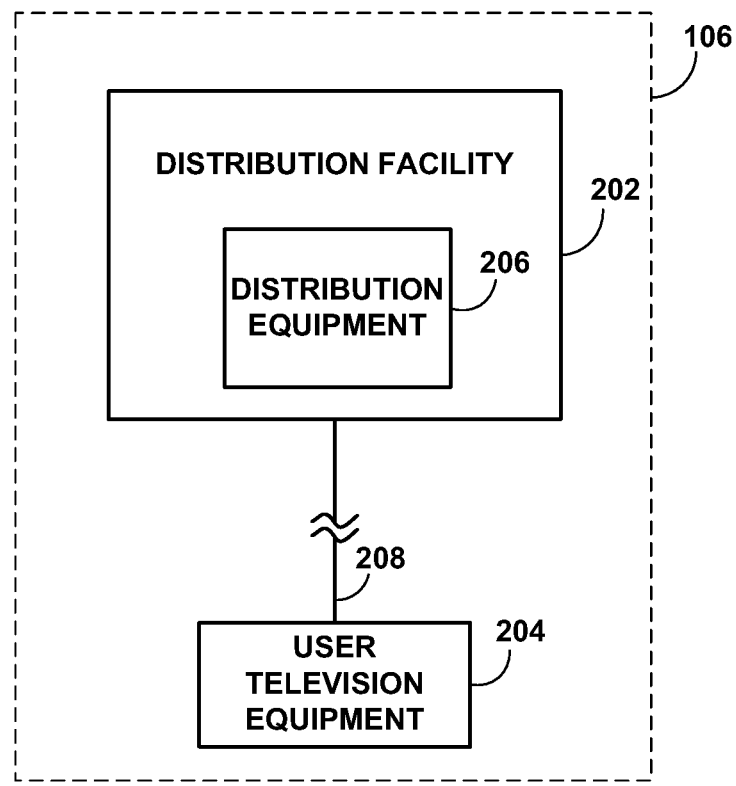
FIGS. 2-7 are illustrative arrangements of the interactive application equipment of FIG. 1 in accordance with various embodiments of the present invention.

An illustrative arrangement for interactive application equipment 106 is shown in FIG. 2. In FIG. 2, interactive application equipment 106 may include distribution facility 202. Distribution facility 202 may be any suitable distribution facility (e.g., a cable system headend, a satellite distribution facility, a broadcast distribution facility, or any other suitable type of distribution facility) capable of providing blackout data and other program guide data to user television equipment 204. Interactive application equipment 106 may include multiple installations of distribution facilities 202 and multiple installations of user television equipment 204, but only one of each have been included in FIG. 2 to avoid over-complicating the drawing.

Distribution facility 202 may receive blackout data and other program guide data from main facility 102 (FIG. 1), from an external information service such as external information service 110 (FIG. 1), or from any other suitable facility or location. In some embodiments, distribution facility 202 may generate program guide data. For example, a computer at distribution facility 204 may generate (or an operator at such a computer may input) blackout data to reflect that a program will be blacked out because a neighboring channel will steal its bandwidth to accommodate a program with increased bandwidth requirements.

Distribution facility 202 may include distribution equipment 206. Distribution equipment 206 may be any equipment suitable for distributing program guide data to user television equipment 204. Distribution equipment 206 may include, for example, suitable transmission hardware for distributing program guide data on a television channel sideband, in the vertical blanking interval of a television channel, using an in-band digital signal, using an out-of-band digital signal, or by any other suitable data transmission technique. Distribution equipment 206 may transmit analog or digital signals comprising programming guide data to user television equipment 204 on multiple television channels.

In some embodiments, distribution facility 202 may include computer equipment or other suitable hardware on which a first portion or version of an interactive television application is implemented. A second portion or version of the application may be implemented on user television equipment 204. The two versions or portions of the interactive television application may communicate using any suitable peer-to-peer communications scheme (e.g., messaging, remote function calls, etc.) and may perform interactive application functions distributively between distribution facility 202 and user television equipment 204.

Distribution facility 202 may provide user television equipment 204 with one or more of blackout data, other program guide data, video media, and television programming over communications path 208. Communications path 208 may be a satellite communications path, a fiber-optic path, a wired communications path, a coaxial cable path, a radio frequency path, an electromagnetic communications path, a microwave communications path, an Internet path, a wireless path, a combination of such paths, or any other suitable communications path.

In some embodiments, distribution facility 202 may periodically transmit program guide data to user equipment 204. For example, blackout data and other program guide data may be updated at user television equipment 204 daily, weekly, or with any other suitable frequency. In some embodiments, distribution facility 202 may transmit program guide data to user television equipment 204 in a real-time data stream. For example, replacement media and other blackout data may be transmitted to user television equipment 204 in real time in the event that a previously scheduled program is blacked out with little advance notice.

In some embodiments, distribution facility 202 may transmit program guide data to user television equipment 204 continuously in a carousel-based approach, in which portions of program guide data (e.g., listings, blackout data, pay-per-view data, etc.) are continuously broadcasted in a time-division multiplexed fashion. In some embodiments, main facility 102 (FIG. 1) may utilize a separate communications link (not shown) to transmit data directly to user equipment 204. In some embodiments, distribution facility 202 or another facility or location may transmit blackout data to user television equipment 204 in a dedicated channel. Distribution facility 202 may, for example, transmit replacement media for blacked-out programs to user television equipment 204 in a dedicated channel. In some approaches, replacement media may be available over a number of dedicated channels in which, for example, metadata may associate the media with blacked-out programs.

Figure 3:
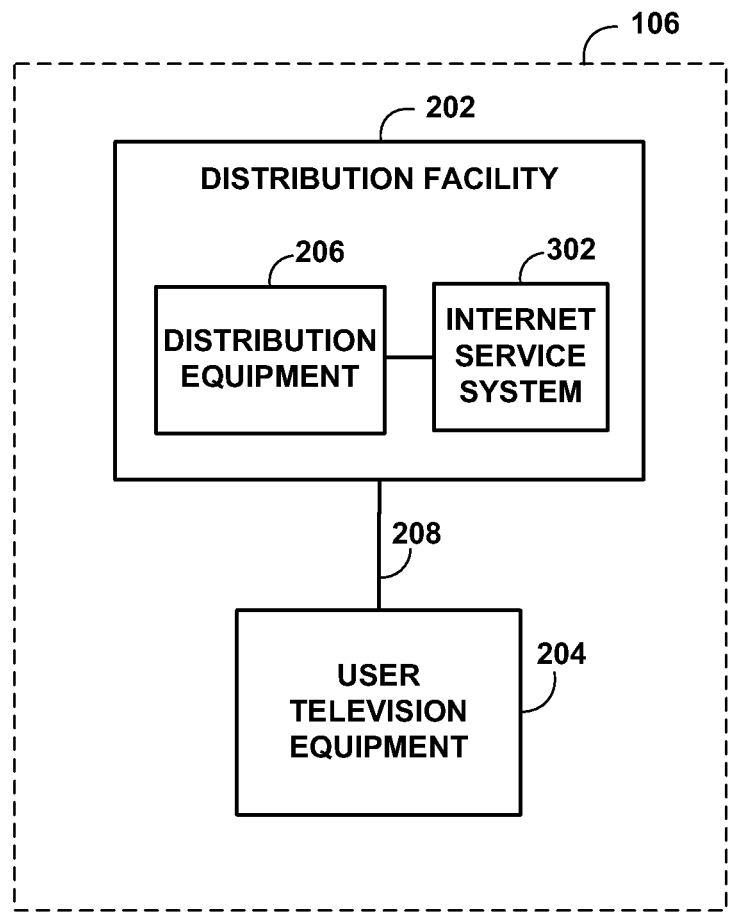

In some embodiments, interactive application equipment 106 may obtain program guide data from main facility 102 (FIG. 1) or external information service 110 (FIG. 1) via the Internet. An illustrative arrangement of interactive application equipment 106 (FIG. 1) for such an approach is shown in FIG. 3. Distribution equipment 206 may obtain program guide data from Internet service system 302. Internet service system 302 may be any combination of hardware and software suitable for providing program guide data to distribution equipment 206 from the Internet. Internet service system 302 may provide blackout data and other program guide data to distribution equipment 206. For example, a sports team may transmit data conveying the blackout of its event to distribution facility 202 via the Internet. In some embodiments, Internet service system 302 may receive replacement media for blacked-out programs.

Figure 4:
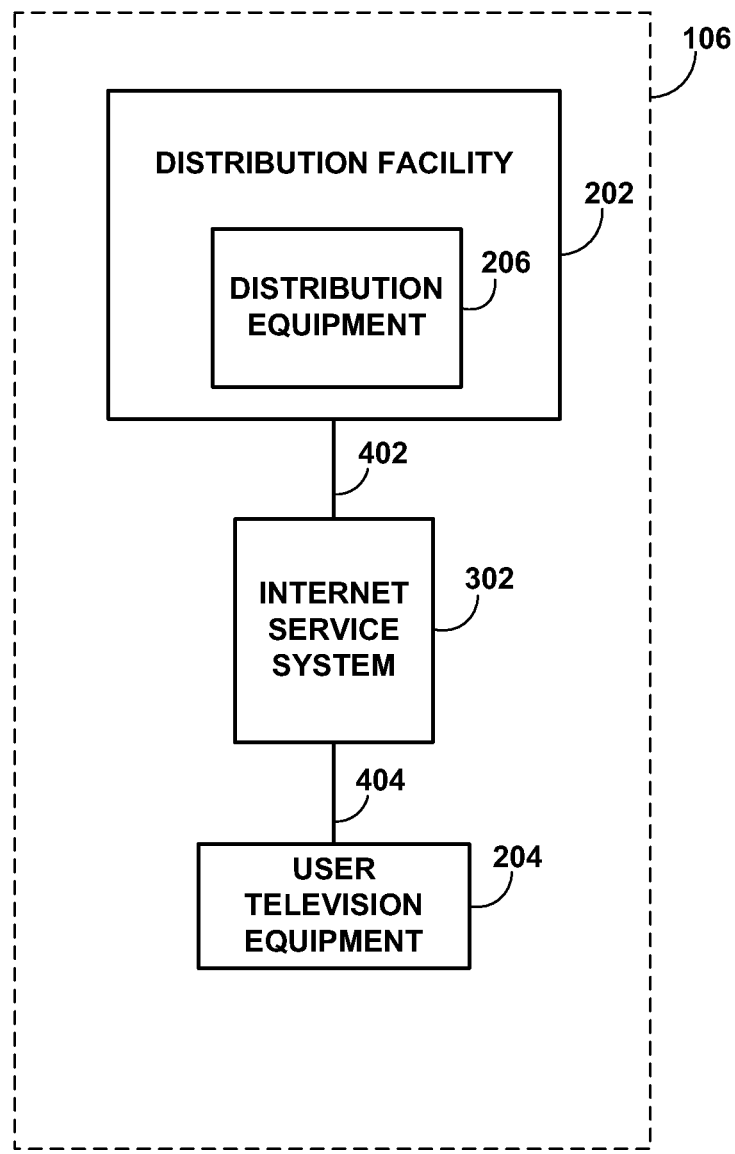

Another illustrative Internet-based approach for interactive application equipment 106 (FIG. 1) is shown in FIG. 4. In this example, distribution facility 202 may provide program guide data (e.g., blackout data, program listings, replacement media, etc.) to user television equipment 204 via Internet service system 302 and suitable communications paths 402 and 404. There may be multiple installations of user television equipment 204 and multiple associated communication paths 404, although only one user television equipment 204 and communications path 404 are shown in FIG. 4 to avoid over-complicating the drawing.

Internet service system 302 may be any suitable combination of hardware and software capable of providing program guide data from distribution equipment 206 to user television equipment 204 using an Internet based approach (e.g., the HyperText Transfer Protocol (HTTP)). Communications paths 402 and 404 may have sufficient bandwidth to allow distribution facility 202 to distribute television programming and other video media to user television equipment 204 via Internet service system 302. For example, Internet service system 302 may transmit regular television programming and media replacing blacked-out programs to user television equipment 204.

Internet service system 302 may provide user television equipment 204 with video and program guide data from other sources on the Internet. For example, a television network Internet data source may inform user television equipment 204 that because a local affiliate channel is scheduled to broadcast the same program as a national channel, the program on the national channel will be blacked out. In some embodiments, main facility 102 (FIG. 1), external data service 110 (FIG. 1), or another facility or location may provide data to user television equipment 204 via Internet service system 302, or other separate Internet service system.

In some embodiments, an interactive program guide application may run partially on user television equipment 204 and partially on other components of interactive application equipment 106 using a suitable client-server or distributed processing arrangement. Client-server program guide systems are described, for example, in Ellis et al. U.S. patent application Ser. No. 09/374,043, filed Aug. 13, 1999, which is hereby incorporated by reference herein in its entirety.

Figure 5:
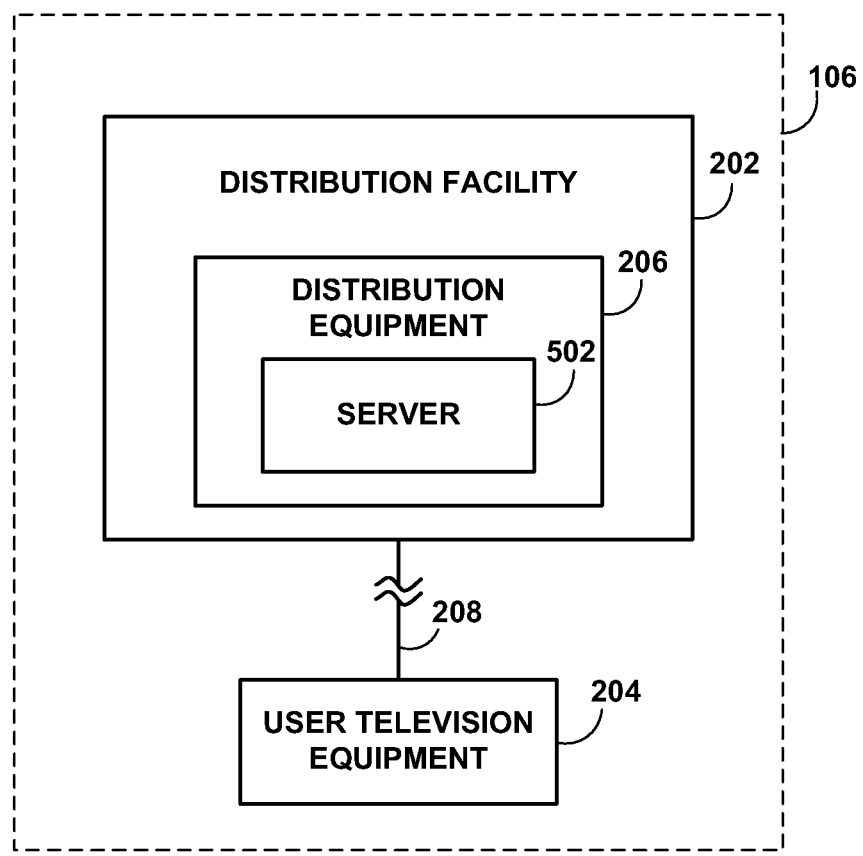

An illustrative client-server arrangement of interactive application equipment 106 (FIG. 1) is shown in FIG. 5. Distribution equipment 206 may include server 502. An application client running on user television equipment 204 may retrieve program guide data from server 502 using any suitable client-server based approach. The client may, for example, pass SQL (structured query language) requests as messages to server 502. In another suitable approach, the application client may invoke remote procedures that reside on server 502 using one or more remote procedure calls. Server 502 may execute SQL statements for such invoked remote procedures. In another suitable approach, client objects executed by the application may communicate with server objects executed by server 502 using, for example, an object request broker (ORB). Server 502 may, for example, run a suitable database engine (e.g., SQL Server by Microsoft) and provide data to an application client implemented on user television equipment 204.

In some embodiments, server 502 may request or otherwise receive blackout data and other program guide data from program guide data source 104 of main facility 102 (FIG. 1). Program guide data received from main facility 102 may update program guide data and, in some embodiments, be utilized to generate program listings display screens with accurate information. For example, server 502 may utilize schedule localizations containing blackout information from main facility 102 (FIG. 1) to generate accurate guide screens and provide blackout features.

In other embodiments, server 502 may receive blackout data and other program guide data from an external information service such as external information service 110 (FIG. 1). In still other embodiments, blackout information may originate at distribution facility 202. For example, an operator at distribution facility 202 may input blackout data or other program guide data stored on server 502 to reflect the blackout.

In some embodiments server 502 may, in response to client requests, transmit program guide data via communications path 208 to user equipment 204 for subsequent processing and program guide display screen generation. For example, server 502 may provide blackout data to user television equipment 204 and user television equipment 204 may subsequently process the data to provide blackout features in an interactive television program guide application. In some of these embodiments, server 502 may store replacement media (e.g., replacement advertisements, videos, etc.) for blacked out programs and provide the replacement media to user television equipment 204 in response to program guide client requests. In other embodiments, sometimes referred to as a "thin client" approach, program guide server 502 may generate program guide displays which are downloaded by the program guide client. If desired, server 502 may be located at main facility 102 (FIG. 1), external information service 110 (FIG. 1), or other location, or a combination thereof.

Figure 6:
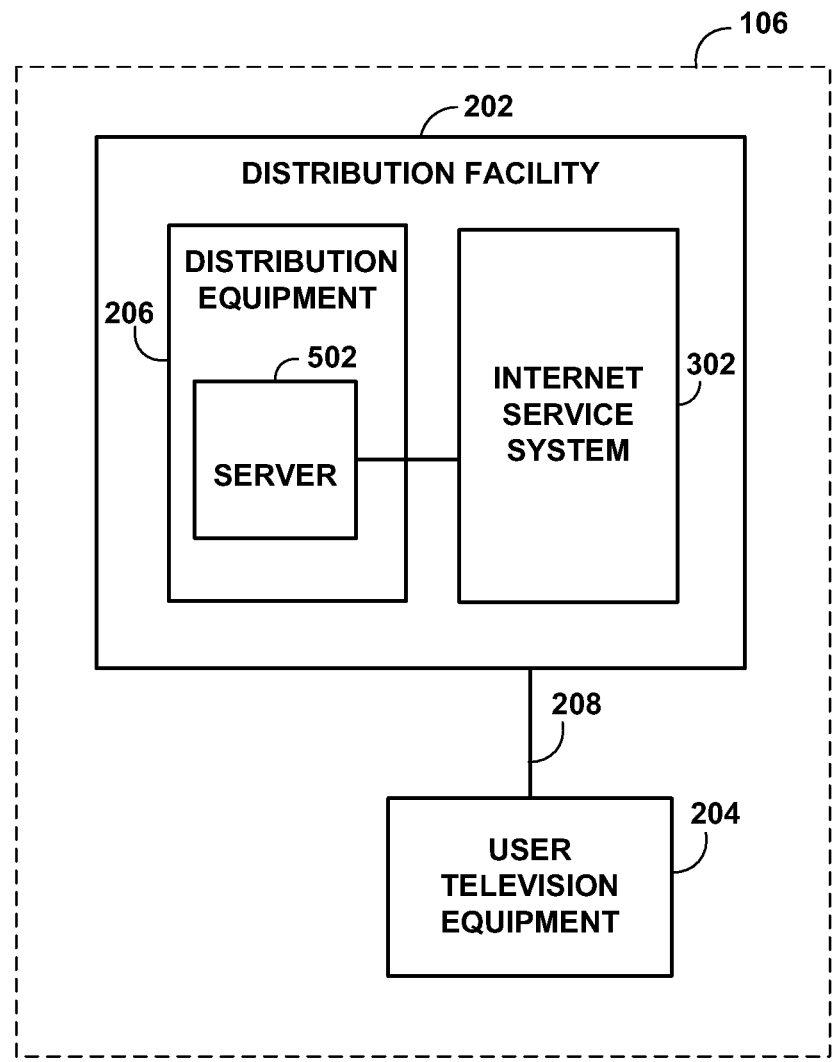

Another illustrative client-server arrangement is shown in FIG. 6. In this example, Internet service system 302 may provide program guide data from the Internet to server 502. Internet service system 302 may be any suitable combination of hardware and software capable of providing data to server 502 using an Internet based approach (e.g., the HyperText Transfer Protocol (HTTP)). Internet service system 302 may provide data to server 502 continuously, daily, upon request by server 502, upon request by user television equipment 204, or in any other suitable approach. In some embodiments, Internet service system 302 may also provide replacement media to server 502.

Figure 7:
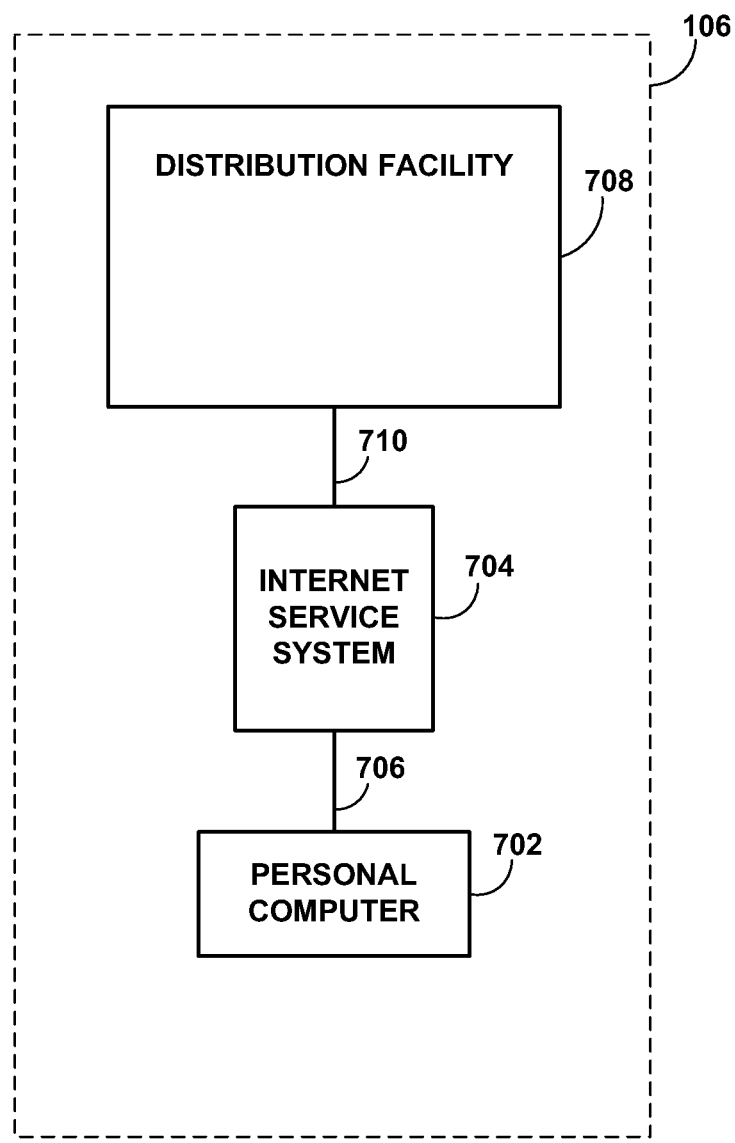

FIG. 7 shows an illustrative arrangement for interactive application equipment 106 for providing an online program guide. Illustrative on-line program guide systems are described, for example, in Boyer et al. U.S. patent application Ser. No. 08/938,028, filed Sep. 18, 1997, which is hereby incorporated by reference herein in its entirety. Interactive application equipment may have personal computer (PC) 702 on which a program guide client or web browser is implemented. Personal computer 702 may be connected to Internet service system 704 via Internet link 706. Internet service system 704 may use any suitable combination of computer hardware and software capable of providing an on-line program guide server application or website (e.g., by providing HTML web pages using HTTP). In the embodiment of FIG. 7, distribution facility 708 may provide Internet service system 704 with program guide data. Distribution facility 708 may be any suitable equipment for distributing blackout data and program guide data (e.g., a cable system headend, a satellite distribution facility, a broadcast distribution facility, or any other suitable type of distribution facility) to Internet service system 704 via Internet link 710. In other suitable approaches, other program guide equipment or facilities such as, for example, main facility 102 (FIG. 1), external information service 110 (FIG. 1), or any other suitable source of program guide data, or a combination thereof, may provide Internet service system 704 with program guide data.

User television equipment 204 of FIGS. 2-6 may be any suitable equipment capable of receiving, processing, and displaying data in an interactive program guide application (e.g., personal computer televisions (PC/TVs), personal computers, cable set-top boxes or satellite receivers with sufficient processing capabilities and display devices, etc.). User television equipment 204 may receive program guide data from distribution facility 202 (FIGS. 2-6), server 502 (FIGS. 5-6), Internet service system 302 (FIGS. 3,4, and 6), or any other suitable facility or location, or a combination thereof, and utilize the data (e.g., blackout data) to generate accurate program listings display screens and to provide blackout features.

Figure 8:
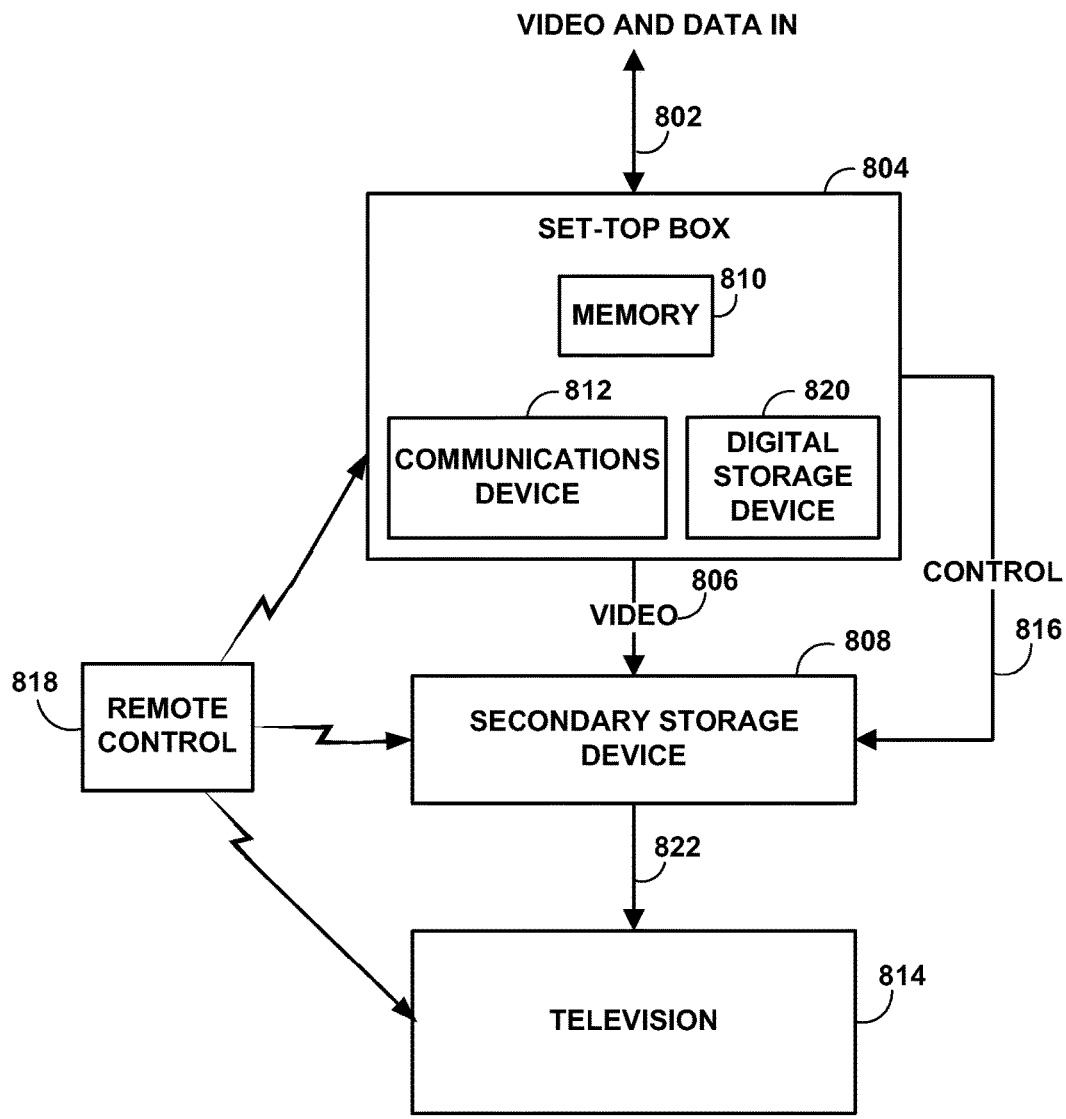
FIGS. 8-9 are illustrative arrangements of the user television equipment of FIGS. 2-6 in accordance with various embodiments of the present invention.

An illustrative arrangement for user television equipment 204 (FIGS. 2-6) is shown in FIG. 8. User television equipment 204 may receive analog or digital programming (e.g., television programming, pay-per-view programming, video-on-demand programming, etc.) and program guide data at input 802 from distribution facility 202 (FIGS. 2-6), main facility 102 (FIG. 1), external information service 110 (FIG. 1), Internet service system 302 (FIGS. 3-4), server 502 (FIGS. 5-6), or other suitable equipment, or a combination thereof, depending on the chosen implementation.

During normal television viewing, a user may tune set-top box 804 to a desired television channel. The signal for that television channel may then be provided at video output 806. The signal supplied at output 806 is typically either a radio-frequency (RF) signal on a predefined channel (e.g., channel 3 or 4), or an analog demodulated video signal, but may also be a digital signal provided on an appropriate digital bus (e.g., a bus using the Institute of Electrical and Electronics Engineers (IEEE) 1394 standard (not shown)). The video signal at output 806 may be received by secondary storage device 808, which may be an optional component in the embodiment of FIG. 8.

Set-top box 804 may have memory 810. Memory 810 may be any memory or other storage device, such as a random access memory (RAM), read only memory (ROM), flash memory, a hard disk drive, a combination of such devices, or any memory suitable for storing application instructions and application data for use by the interactive application.

Set-top box 804 may have communications device 812 for communicating directly with distribution facility 202 (FIGS. 2-6), server 502 (FIGS. 5-6) Internet service system 302 (FIGS. 3-4, FIG. 6), external information service 110 (FIG. 1), or other suitable equipment over suitable communications paths. Communications device 812 may be a modem (e.g., cable modem, telephone modem, digital subscriber line (DSL) modem, integrated service digital network (ISDN) modem, or any suitable analog or digital modem), network interface card (e.g., an Ethernet card, etc.), or other suitable communications device. Communications device 812 may also be a personal computer with an Internet connection in, for example, the arrangements shown in FIGS. 3 and 4. In some embodiments, communications device 812 may be a component of television 814.

Secondary storage device 808 may be any suitable type of analog or digital program storage device or player (e.g., a videocassette recorder (VCR), a personal video recorder (PVR), a digital versatile disc (DVD) player, etc.). In some embodiments, blackout data may be stored in secondary storage device 808. Program recording and other features may be controlled by set-top box 804 using control path 816. If secondary storage device 808 is a videocassette recorder or a personal video recorder, for example, a typical control path 816 may involve the use of an infrared transmitter coupled to the infrared receiver in the recorder that normally accepts commands from a remote control such as remote control 818. Remote control 818 may be used to control set-top box 804, secondary storage device 808, and television 814.

An interactive television program guide may run on set-top box 804, television 814 (provided that television 814 has suitable processing circuitry and memory), a suitable analog or digital receiver (not shown) connected to television 814, or digital storage device 820 if digital storage device 820 has suitable processing circuitry and memory. The interactive television program guide may also run cooperatively on a suitable combination of these devices. Interactive television application systems in which a cooperative interactive television program guide application runs on multiple devices are described, for example, in Ellis U.S. patent application Ser. No. 09/186,598, filed Nov. 5, 1998, which is hereby incorporated by reference herein in its entirety.

If desired, a user may record programming (e.g., television programs, pay-per-view programs, video-on-demand (VOD) programs, non-video-on-demand programs, etc.) in digital form on digital storage device 820. Digital storage device 820 may also record program guide data including, for example, blackout data and replacement media. Digital storage device 820 may be contained in set-top box 804 or it may be an external device connected to set-top box 804 via an input/output port and appropriate interface. Digital storage device 820 may be a writeable optical storage device (such as a DVD player capable of handling recordable DVD discs), a magnetic storage device (such as a disk drive or digital tape), or any other digital storage device. Interactive television program guide systems that have digital storage devices are described, for example, in Hassell et al. U.S. patent application Ser. No. 09/157,256, filed Sep. 17, 1998, which is hereby incorporated by reference herein in its entirety.

Processing circuitry in set-top box 804 may format received video, audio and data signals into a digital file format. The file format may be an open file format such as the Moving Picture Experts Group (MPEG) MPEG-2 standard or the Moving Joint Photographic Experts Group (MJPEG) standard. The resulting data may be streamed to and stored in digital storage device 820, secondary storage device 808, or other storage device via an appropriate bus (not shown) (e.g., a bus using the Institute Electrical and Electronics Engineers (IEEE) 1394 standard). In some embodiments, an MPEG-2 data stream or series of files may be received from distribution facility 202 (FIGS. 2-6), Internet service system 302 (FIGS. 3-4, and 6), or other system and stored by digital storage device 820 or secondary storage device 808.

Television 814 may receive video signals from secondary storage device 808 via communications path 822. The video signals on communications path 822 may either be generated by secondary storage device 808 when playing back a prerecorded storage medium (e.g., a videocassette or a recordable digital video disc), by digital storage device 820 when playing back a prerecorded digital medium, may be passed through from set-top box 804, may be provided directly to television 814 from set-top box 804 if secondary storage device 808 is not included in user television equipment 204 (FIGS. 2-6), or may be received directly by television 814 from any other suitable facility or location (e.g., main facility 102 (FIG. 1)). During normal television viewing, the video signals provided to television 814 may correspond to the desired channel to which a user has tuned with set-top box 804. Video signals may also be provided to television 814 by set-top box 804 when set-top box 804 is used to play back information stored on digital storage device 820.

Figure 9:
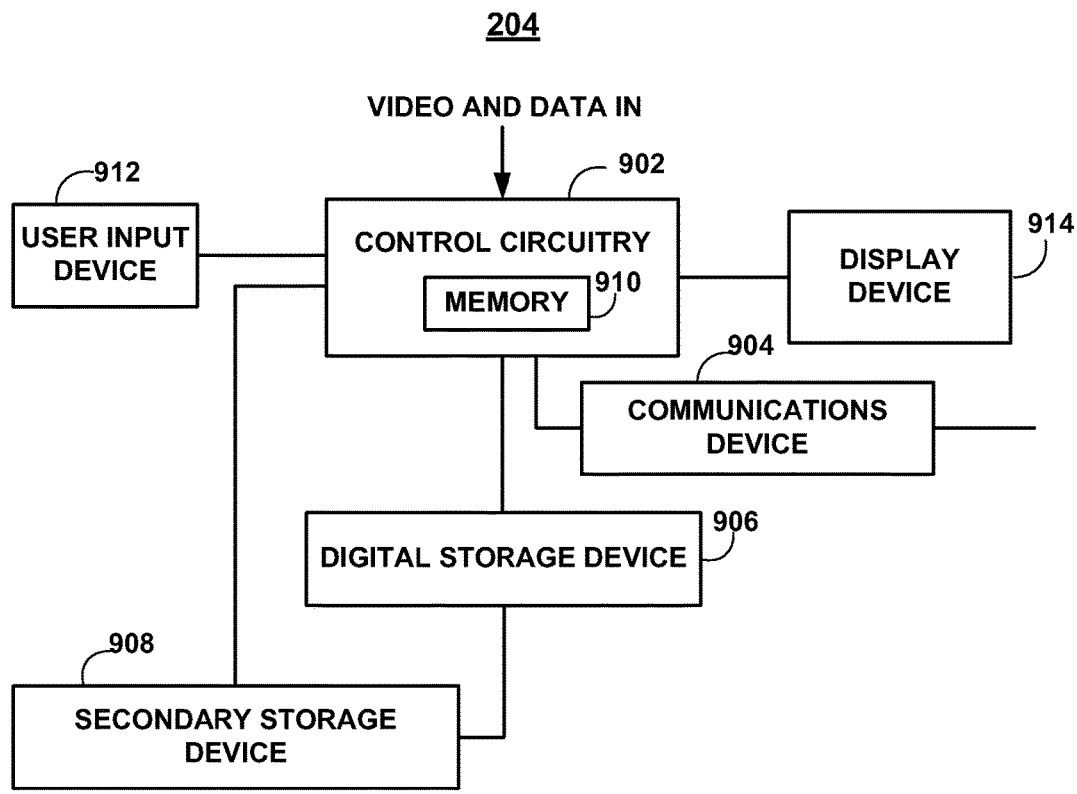

FIG. 9 is a illustrative schematic block diagram of portions of user television equipment 204 (FIGS. 2-6), in accordance with various embodiments of the present invention. Blackout data and other program guide data from distribution facility 202 (FIGS. 2-6), main facility 102 (FIG. 1), external information service 110 (FIG. 1), server 502 (FIGS. 5-6), Internet service provider 302 (FIGS. 3, 4, and 6), or other suitable equipment or location may be received by control circuitry 902 or received by communications device 904 and provided to control circuitry 902.

Control circuitry 902 may include a processor or processing circuitry for receiving and processing program guide instructions. Control circuitry 902 may include any suitable processor, such as a microprocessor or group of microprocessors, and other processing circuitry such as caching circuitry, direct memory access (DMA) circuitry, input/output (I/O) circuitry, etc. For example, control circuitry 902 may process program guide instructions to generate program guide display screens. As another example, control circuitry 902 may process blackout data to provide record commands to a suitable storage device. Still another example, control circuitry 902 may maintain a user viewing history and process program guide data to generate a list of program recommendations. The functions of control circuitry 902 may be integrated into an advanced television receiver, personal computer television (PC/TV), or any other suitable arrangement. If desired, a combination of such arrangements may be used.

Digital storage device 906 and secondary storage device 908 may record media and store program guide data. Secondary storage device 908 may be any suitable type of analog or digital program storage device (e.g., a videocassette recorder (VCR), a personal video recorder (PVR), a digital versatile disc (DVD), etc.). Digital storage device 906 may be, for example, a writeable optical storage device (such as a DVD player capable of handling recordable DVD discs), a magnetic storage device (such as a disk drive or digital tape), or any other digital storage device. Program recording and other features may be controlled by control circuitry 902. For example, control circuitry 902 may instruct secondary storage device 908 and digital storage device 906 to record television programming.

Memory 910 may be any memory or other storage device, such as a random access memory (RAM), read only memory (ROM), flash memory, a hard disk drive, a combination of such devices, etc., that is suitable for storing program guide data for use by control circuitry 902.

Communications device 904 may be supporting communications between user television equipment 204 and distribution equipment 202 (FIGS. 2-6), server 502 (FIGS. 5-6), Internet service system 302 (FIGS. 3,4, and 6), external information service 110 (FIG. 1), or other suitable equipment or location. Communications device 904 may be a modem (e.g., a cable modem, digital subscriber line (DSL) modem, telephone modem, integrated services digital network (ISDN) modem, or any suitable analog or digital modem), network interface card (e.g., an Ethernet card, Token ring card, etc.), or any other suitable communications device.

User input device 912 may be any suitable input device for allowing a user to communicate to the program guide. For example, a user may select a program listing from a program guide listings display screen or order a pay-per-view program with user input device 912. User input device 912 may be a pointing device, wireless remote control, keyboard, touch-pad, voice recognition system, or any other suitable user input device. User-entered instructions from user input device 912 may instruct control circuitry 902 to direct an audio device (not shown) to provide audio (e.g., music, talk-radio, television audio, etc.). During normal television viewing, user-entered instructions from user input device 912 may instruct control circuitry 902 to direct display device 914 to display a desired television channel on display device 914. Display device 914 may be any suitable television, monitor, or other suitable display device. To provide a user with program guide options, the program guide running on user television equipment 204 (FIGS. 2-6, and 8) may generate, for example, an information display screen, a pay-per-view display screen, or other desired display screen for display on display device 914.

In some embodiments, the program guide may, based on blackout data supplied to user television equipment 204, generate control data that governs the recording of blacked-out programs on digital storage device (820, 906), secondary storage device (808, 908), or any other storage device used in user television equipment 204. For example, the program guide may generate control data that prevents recording commands from being sent to secondary storage device (808, 908) that would instruct secondary storage device (808, 908) to record a blacked-out program. In addition, the program guide may generate control data that prevents the recording of blacked-out programs onto digital storage device (820, 906). As another example, the program guide may instruct secondary storage device (808, 908) or digital storage device (820, 906) to postpone the recording of a blacked-out program which was previously designated for recording until the blacked-out program, if ever, becomes available. Still another example, the program guide may generate control data that commands secondary storage device (808, 908) or digital storage device (820, 906) to record an alternate program in place of a blacked-out program.

In some embodiments, the program guide running may automatically command secondary storage device (808, 908) or digital storage device (820, 906) to record a program with similar program attributes, a program the user frequently watches, or any other program in place of a blacked-out program that was designated by a user for recording. In some embodiments, a user may be permitted to set a default program, channel, genre, or other classification characteristics used by the program guide to automatically specify replacement programs. In some approaches, the program guide may generate display screens that have program recommendations.

In some embodiments, the interactive television program guide may provide programming blackout replacement media for programming blackouts. Replacement media may be displayed on a user television equipment display screen (e.g., television 814, display device 914, etc.) in place of blacked-out programs. Replacement media may be, for example, regularly scheduled and broadcast programs that are recommended to a user by the interactive program guide. Replacement media may be, for example, supplemental media transmitted to or displayed by user television equipment 204 (FIGS. 2-6, and 8-9) associated with a program that has been blacked out. In some embodiments, distribution facility 202 (FIGS. 2-6) may distribute replacement media on the channel of a blacked-out program if the channel has the available bandwidth. For example, distribution facility 202 (FIGS. 2-6) may distribute replacement media advertisements on the channel of a blacked-out program.

Replacement media may be, for example, targeted advertisements. The targeted advertisements or the replacement media may have been previously downloaded by the program guide. The targeted advertisements may be characterized by a similar genre, subject matter or channel as the program that has been blacked out, or may be targeted or purely user-related subject matter (e.g., based on a user's viewing history). Other examples of replacement media may be, for example, movie trailers, selected scenes in a movie, music videos, and audio clips. These too may be targeted.

In some embodiments, the program guide may display a list of available replacement media for a blacked-out program and provide a user with the option to select replacement media from the list. For example, the program guide may instruct communications device (812, 904) to selectively receive or tune to replacement media from one of a plurality of replacement media channels and may instruct a recording device (e.g., digital storage device (820, 906), secondary storage device (808, 908), etc.) to record the media in place of a blacked-out program.

Some program blackouts such as bandwidth blackouts, affiliate protection blackouts, and venue protection blackouts generally have well-defined characteristics with respect to the amount of advance notice with which they may be identified. In some embodiments, the approach used to transmit blackout data may be based on the amount of advance notice for a given type of blackout. Blackout data for blackouts that are known sufficiently in advance may be integrated into regular schedule localizations containing other program guide date rather than sent separately, despite the fact that each of the two methods may be suitable for updating the program listings information. For example, because sporting events are generally scheduled far in advance, blackout data for a bandwidth blackout resulting from the broadcast of a sports-related program may typically be included in regular schedule localizations. Blackout data for blackouts that are identified within close proximity to the previously scheduled broadcast may be sent separately from other program guide data. For example, because the decision to black out a sporting event may not be made until the day of the event, blackout data for a venue protection blackout resulting from poor ticket sales of a sporting event may typically be sent separately from other program guide data.

Which facility or facilities identifies a blackout and generates blackout data may be based on the type of blackout that is to take place. For example, because bandwidth blackouts occur when a program has larger than typical bandwidth requirements, bandwidth blackout data may be generated by the distribution facility (e.g., distribution facility 202 (FIGS. 2-6)) that distributes the blacked-out program. As another example, because venue protection blackouts may result when a sporting event or other event experiences poor ticket sales, venue protection blackout data may be generated by a data source run by the venue (i.e., the venue may act as an external data source 110 (FIG. 1)). A venue may, for example, provide a program guide application facility (e.g., main facility 102 (FIG. 1), distribution facility 202 (FIGS. 2-6), etc.) with blackout data via an Internet source accessible by Internet service provider 302 (FIGS. 3-4, and 6). As another example, because an affiliate protection blackout results when a local affiliate and a national channel are scheduled to provide the same program, affiliate protection blackout data may be generated by the program guide running on user television equipment 204 (FIGS. 2-6, and 8-9), server 502 (FIGS. 5-6), or any other facility or location that has program listings data. The program guide running on user television equipment 204, or any other suitable facility or location that has program listings data, may check program listings schedules for data that may indicate the occurrence of a blackout, such as the scheduling of a common program by a local affiliate and a national channel.

A program guide implemented on interactive application equipment 106 (FIGS. 1-6) may change its displays and available options based on blackout data. FIGS. 10-24 show program guide display screens in accordance with one embodiment of the present invention. The display screens of FIGS. 10-28 are only illustrative. Any other suitable user interface approach may be used. For example, other illustrative interface displays are described in Moore et al. U.S. patent application Ser. No. 09/668,678, filed Sep. 22, 2000, and Knudson et al. U.S. patent application Ser. No. 09/357,941, which are hereby incorporated by reference herein in their entireties.

Figure 10:
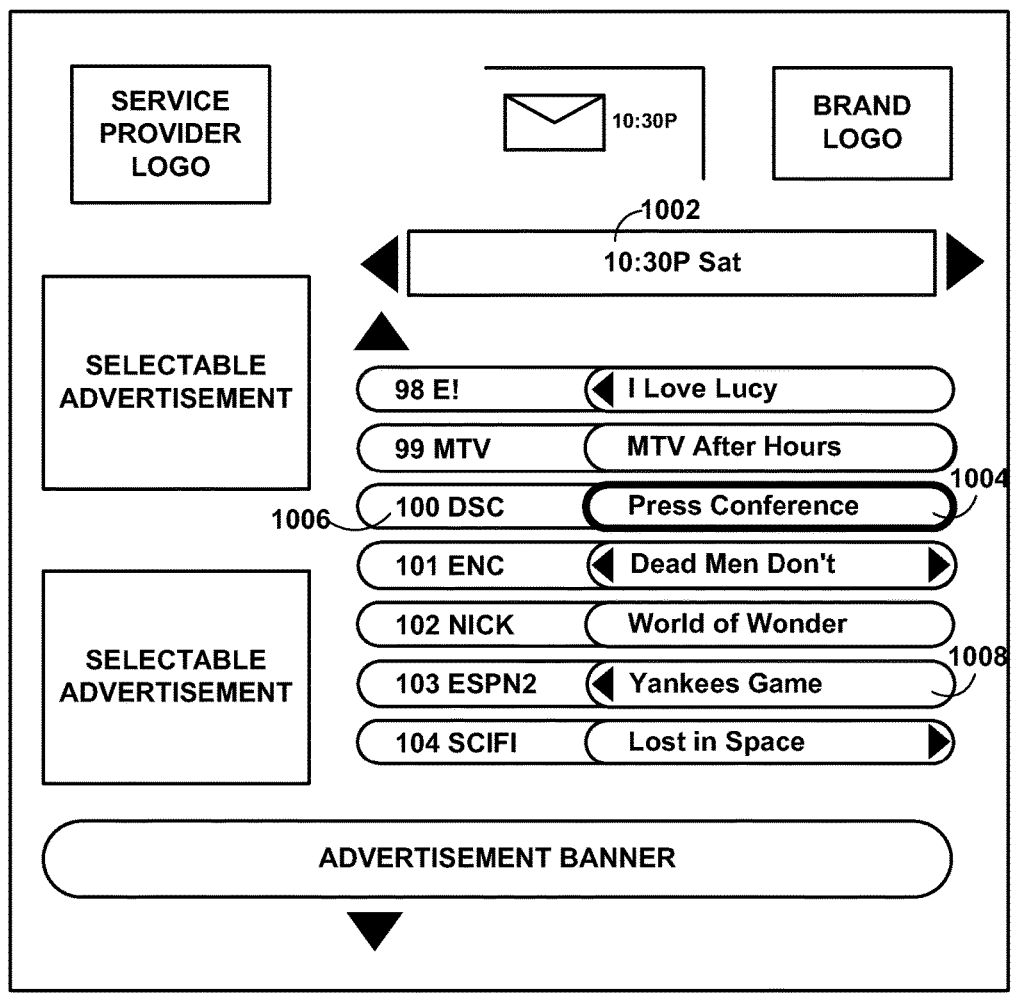
FIG. 10 is an illustrative program listings display screen before a blackout in accordance with one embodiment of the present invention.
Figure 11:
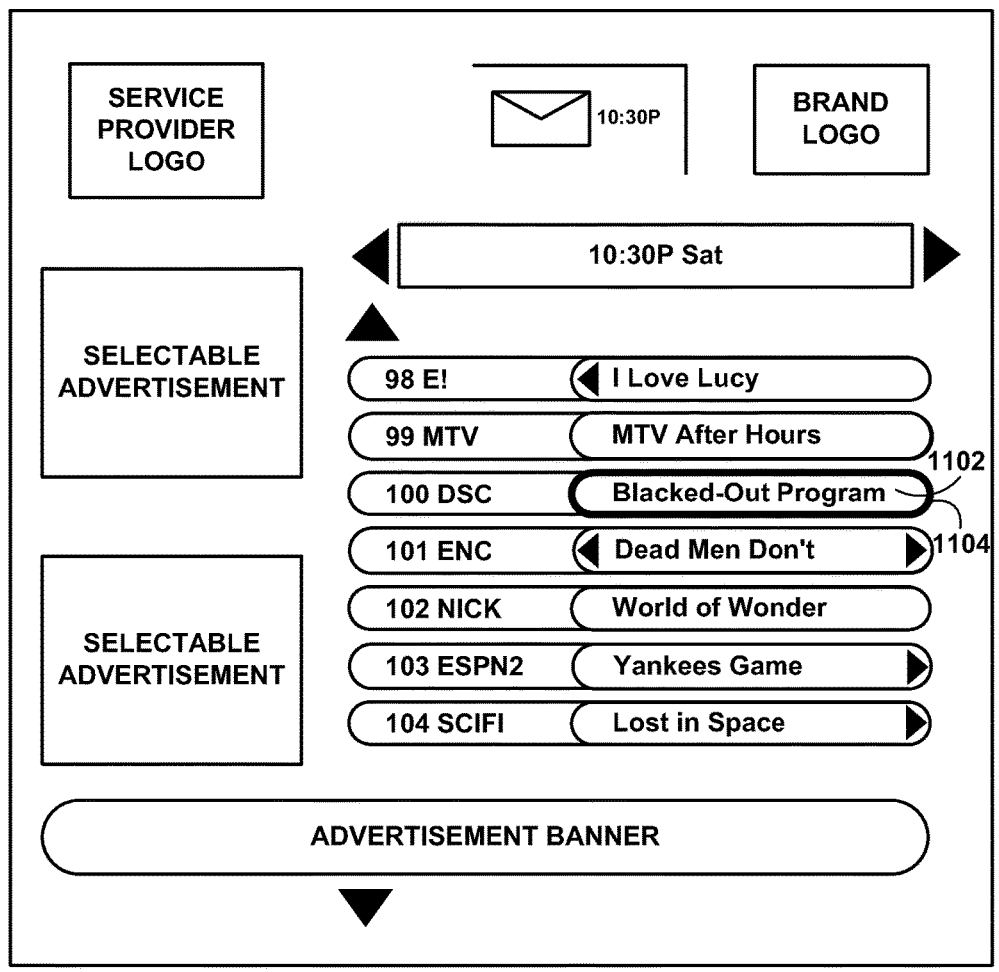
FIGS. 11-13 are illustrative program listings display screens after a blackout in accordance with various embodiments of the present invention.
Figure 12:
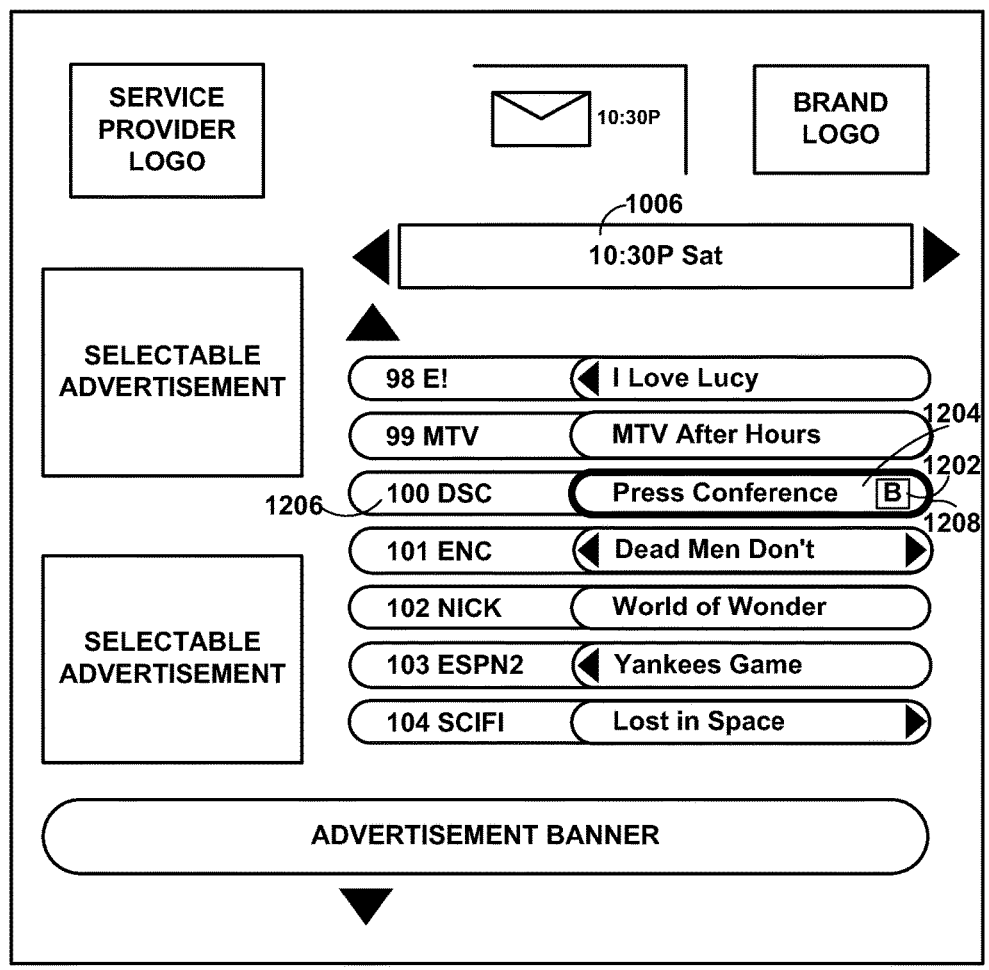

FIG. 10 shows an illustrative television program listings display screen 1000 as it may appear prior to a blackout. In display screen 1000, program listings for a specific time period 1002 may be displayed. In this example, program "Press Conference" 1004 is available on channel "100 DSC" 1006. When program "Press Conference" 1004 is blacked out, the program guide may update the program listings display screen to indicate the blackout. In some embodiments, the type of blackout (e.g., bandwidth blackout, affiliate protection blackout, venue protection blackout, etc.) may determine the way the program guide updates program guide display screens. Turning to FIG. 11, for example, the program guide may replace program title "Press Conference" 1004 (FIG. 10) with "Blacked-Out Program" indicator 1102 when a bandwidth blackout prevents program 1004 from being available. Turning to FIG. 12, in another example, the program guide may include indicator 1202 in the guide listing for program "Press Conference" 1204 to indicate that an affiliate protection blackout of program 1004 (FIG. 10) has occurred. The program guide may automatically tune to the local affiliate channel showing the blacked-out program 1004 in response to user selection of program 1204 (e.g., by pressing a remote control "OK" key from remote control 818 (FIG. 8)).

Figure 13:
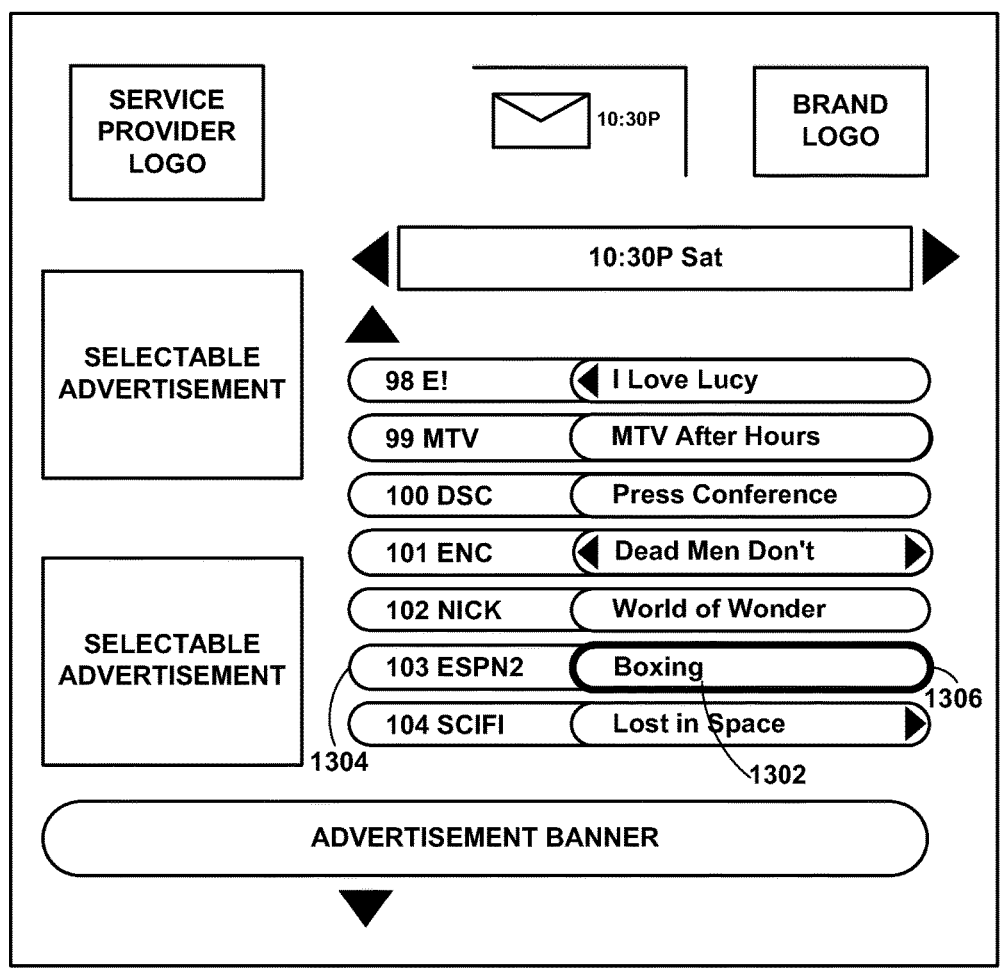

Turning to FIG. 13, in still another example, the program guide may replace the listing for program "Yankees Game" 1008 (FIG. 10) with replacement media "Boxing" 1302 when a venue protection blackout of program 1008 has occurred. The program guide may have automatically replaced program "Yankees Game" 1008 (FIG. 10) with replacement media "Boxing" 1302 for a number of reasons. For example, replacement media 1302 and blacked-out program "Yankees Game" 1008 (FIG. 10) may have similar program characteristics, a user viewing history may indicate a user interest in sporting events, or the venue that refused to televise program 1008 may have provided program 1302 as replacement media. In FIG. 13, the absence of an indicator (e.g., such as indicator 1202 (FIG. 12)) may prevent the user from being alerted that program "Boxing" 1302 is replacement media and not the program that was originally scheduled for channel "103 ESPN2" 1304. In other embodiments, an indicator such as indicator 1202 (FIG. 12) may alert the user that program "Boxing" 1302 is replacement media.

Indicator 1102 (FIG. 11) and indicator 1202 (FIG. 12) are only illustrative, and any other suitable indicators may be used to indicate a program blackout (e.g., other phrase or word, graphic, icon, etc.). In some embodiments, the guide may indicate a blackout without regard to the type of blackout using indicator 1202 (FIG. 11) or indicator 1202 (FIG. 12) exclusively. Indicator 1202 (FIG. 12), however, allows the user to view the title of the blackout program or, in other embodiments, its replacement media.

Figure 14:
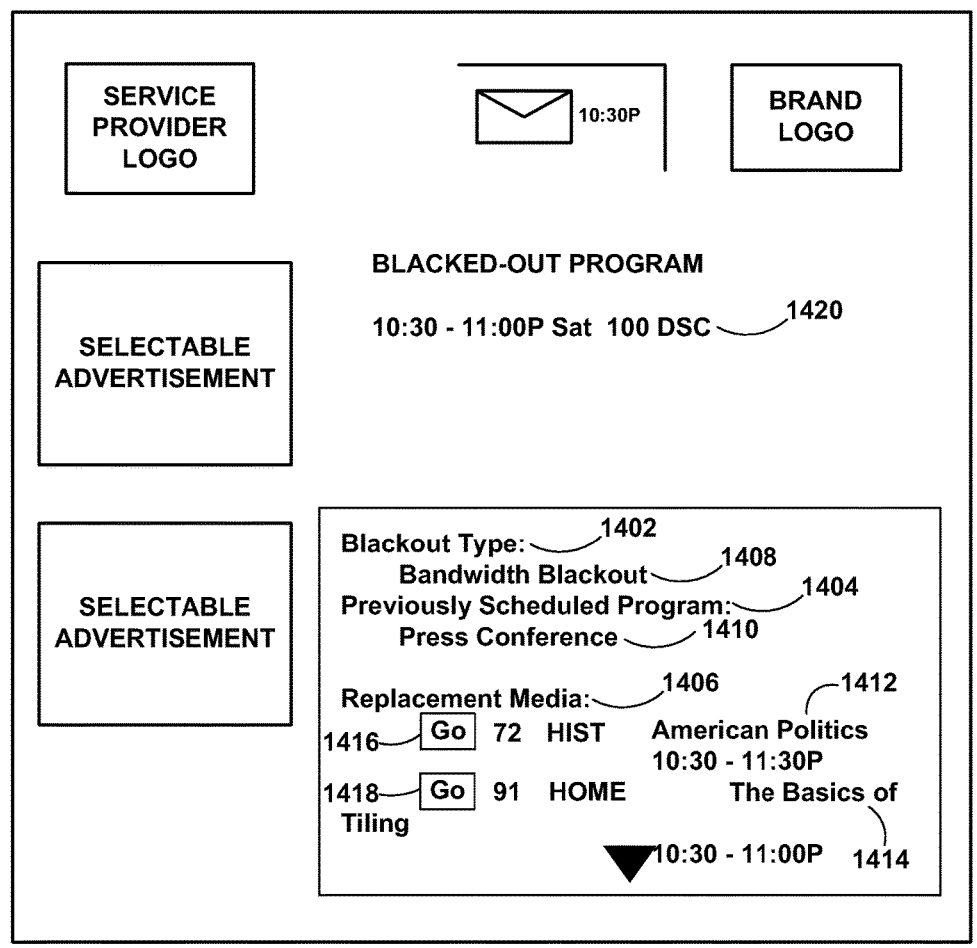
FIGS. 14-17 are illustrative blackout information display screens in accordance with various embodiments of the present invention.

Highlight regions 1104, 1208, and 1306 of FIGS. 11-13 indicate the currently active program listing. When a particular program listing is active, the guide may provide a more detailed description of the highlighted program in response to, for example, user selection of an "INFO" key, "OK" key, or other key from a remote control such as remote control 818 (FIG. 8). FIG. 14 shows an illustrative additional information display screen 1400 that the program guide may display in response to a user indicating "Blacked-Out Program" 1102 (FIG. 11). Display screen 1400 may provide a user with blackout data and blackout features for "Blacked-Out Program" 1102 (FIG. 11). In the embodiment of FIG. 14, blackout information such as blackout type 1402, title of the blacked-out program 1404, and replacement media 1406 may be available to the user. Particularly, display screen 1400 may indicate that a "Bandwidth Blackout" 1408 of program "Press Conference" 1410 has occurred, and that replacement media "American Politics" 1412 and "The Basics of Tiling" 1414 are available. Replacement media 1412 may have similar program characteristics (e.g. politically-related programming) as blacked-out program 1410. Replacement media 1414 may have similar program characteristics as a user viewing history. For example, a user viewing history may indicate a user interest in home improvement programming, and replacement media 1414 may be another home improvement program. The program guide may tune to the channel of replacement media 1412 or 1414 in response to user selection of "GO" options 1416 or 1418, respectively.

In some embodiments, the program guide may provide replacement media from sources other than regularly broadcast and available television channels. For example, a distribution facility 202 (FIGS. 2-6) or server 502 (FIGS. 5-6) may provide replacement media to user television equipment 204 (FIGS. 2-6, and 8-9) in a dedicated channel, or in a number of dedicated channels, depending on the arrangement of the program guide system. As another example, Internet service system 704 (FIG. 7) may provide replacement media to personal computer 702 from an on-line website. Still another example, distribution facility 202 (FIGS. 2-6 or distribution facility 708 (FIG. 7) may broadcast the replacement program in the bandwidth normally occupied by channel "100 DSC 1420" for blackouts in which the bandwidth of the blackout program is available. Still another example, server 502 (FIGS. 5-6), user television equipment 204 (FIGS. 2-6, and 8), personal computer 702 (FIG. 7), or other suitable program guide equipment may store replacement media or programs for use by the program guide in the event of a blackout. For example, a program guide user may record a program onto a storage device, such as secondary storage device (808, 908) or digital storage device (820, 906), or server 502 (FIGS. 5-6) may record a program on a server database for use by the program guide in the event of a blackout.

Figure 15:
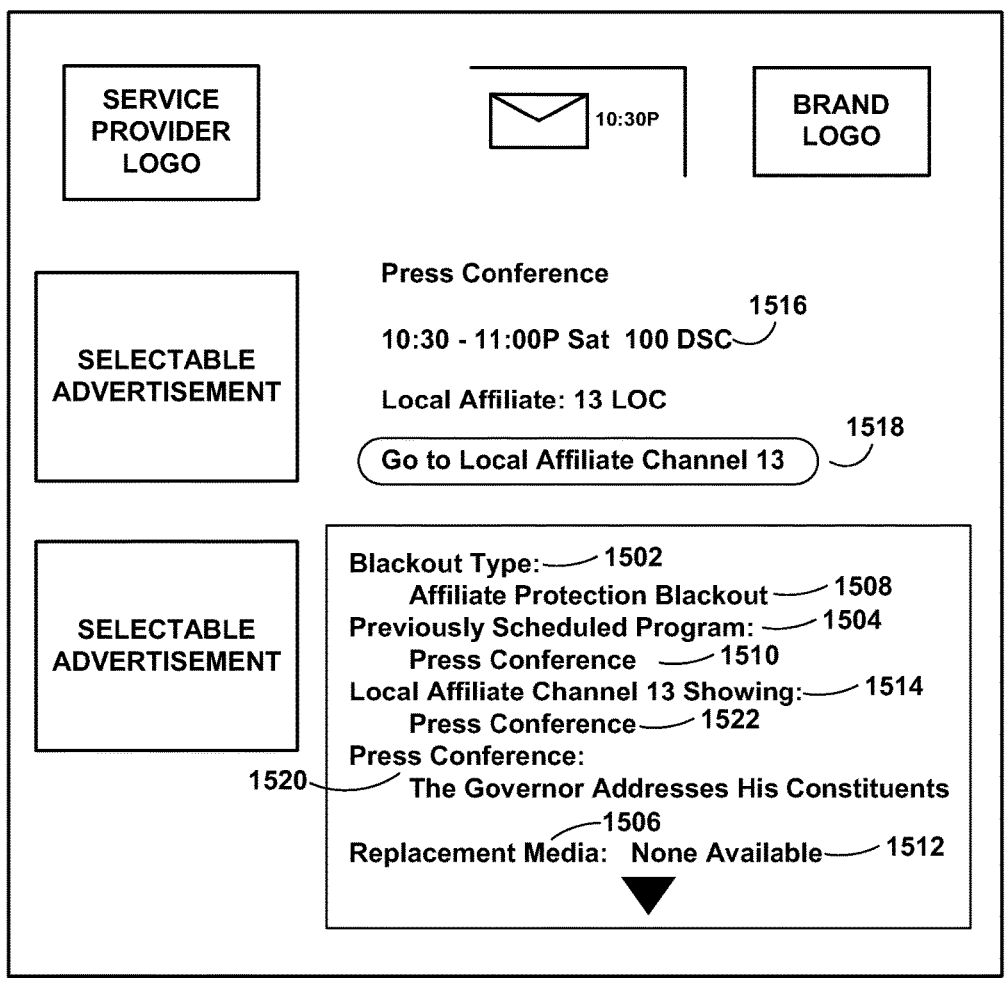

FIG. 15 shows illustrative information display screen 1500 that the program guide may display in response to a user selecting program listing "Press Conference" 1204 (FIG. 12) to obtain additional information. Display screen 1500 may provide a user with blackout information and blackout features for program "Press Conference" 1204 (FIG. 12). In the embodiment of FIG. 15, blackout information such as blackout type 1502, title of the blacked-out program 1504, availability of replacement media 1506, and other blackout information may be available to the user. Particularly, information in display screen 1500 may indicate that an "Affiliate Protection Blackout" 1508 of program "Press Conference" 1510 has occurred, and that no replacement media is available 1512. In addition, information in display screen 1500 may indicate that a local affiliate channel 1514 is showing the blacked-out program. The program guide may tune to the local affiliate channel in response to user selection of option 1518. A description 1520 of program "Press Conference" 1522 may be available in display screen 1500.

Figure 16:
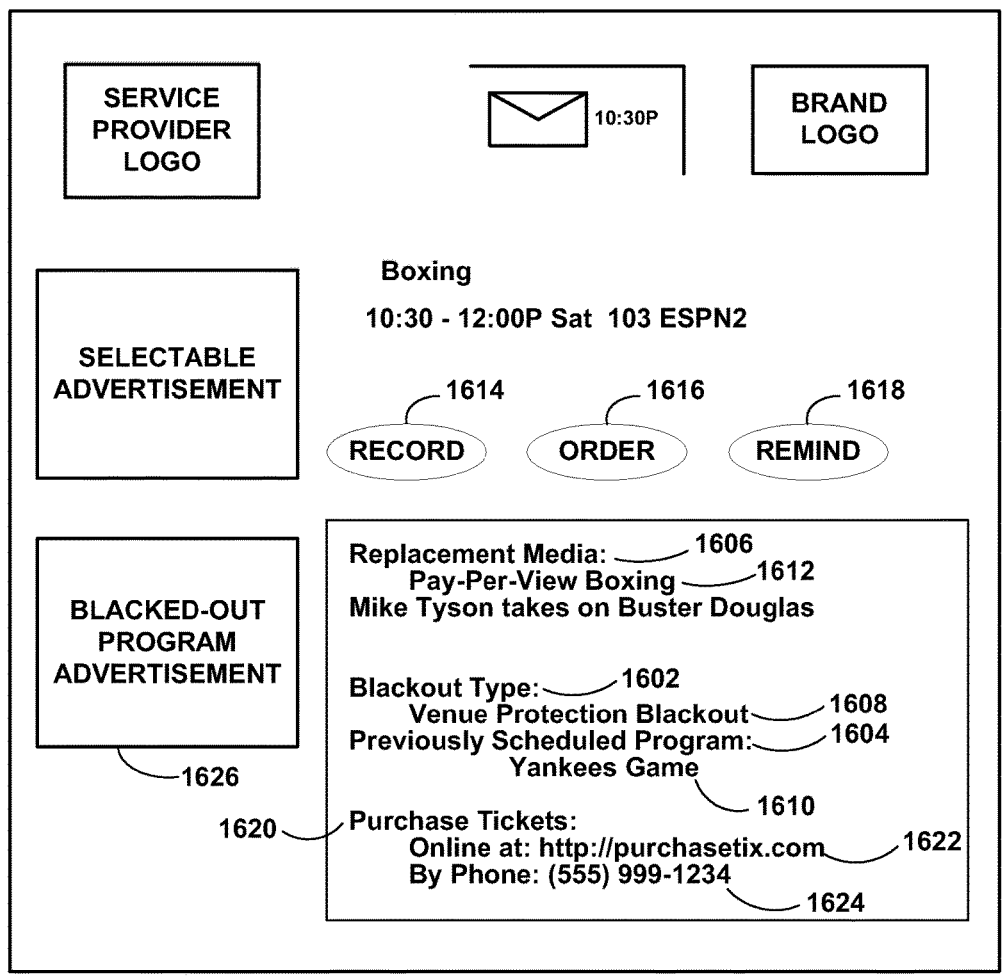

FIG. 16 shows an illustrative information display screen that the program guide may display in response to a user selecting program listing "Boxing" 1302 (FIG. 13) to access additional information. Display screen 1600 may provide a user with blackout information and blackout features for program "Boxing" 1302 (FIG. 13). In the embodiment of FIG. 16, blackout information such as blackout type 1602, title of the blacked-out program 1604, availability of replacement media 1606, and other blackout information may be available to the user. In this example, information in display screen 1600 indicates that a "Venue Protection Blackout" 1608 of program "Yankees Game" 1610 has occurred, and that replacement media "Pay-Per-View Boxing" is available 1612. The program guide may recommend pay-per-view program 1612 because it has similar program characteristics as blacked-out program 1610 (e.g., sports-related). A user may be permitted to record, order, or set a reminder for this replacement media by selecting option 1614, option 1616, or option 1618, respectively. In some embodiments, the program guide may recommend pay-per-view and video-on-demand programs in place of blacked-out programs in an attempt to increase pay-per-view and video-on-demand derived revenue.

Other types of blackout information may be provided in display screen 1600, such as ticket purchase information 1620. Particularly, a user may be permitted to purchase tickets on an online website 1622 or by phone 1624. For example, Internet universal resource locator (URL) 1622, or other icon or indicator, may provide a hyperlink to an Internet site where tickets may be purchased. As another example, URL 1622 may send a request to a server, such as server 502 (FIGS. 5-6) to obtain data on an Internet site. Blacked-out program advertisement 1626 (e.g., provided by the venue as replacement media) may encourage the user to purchase tickets for the blacked-out venue event.

Figure 17:
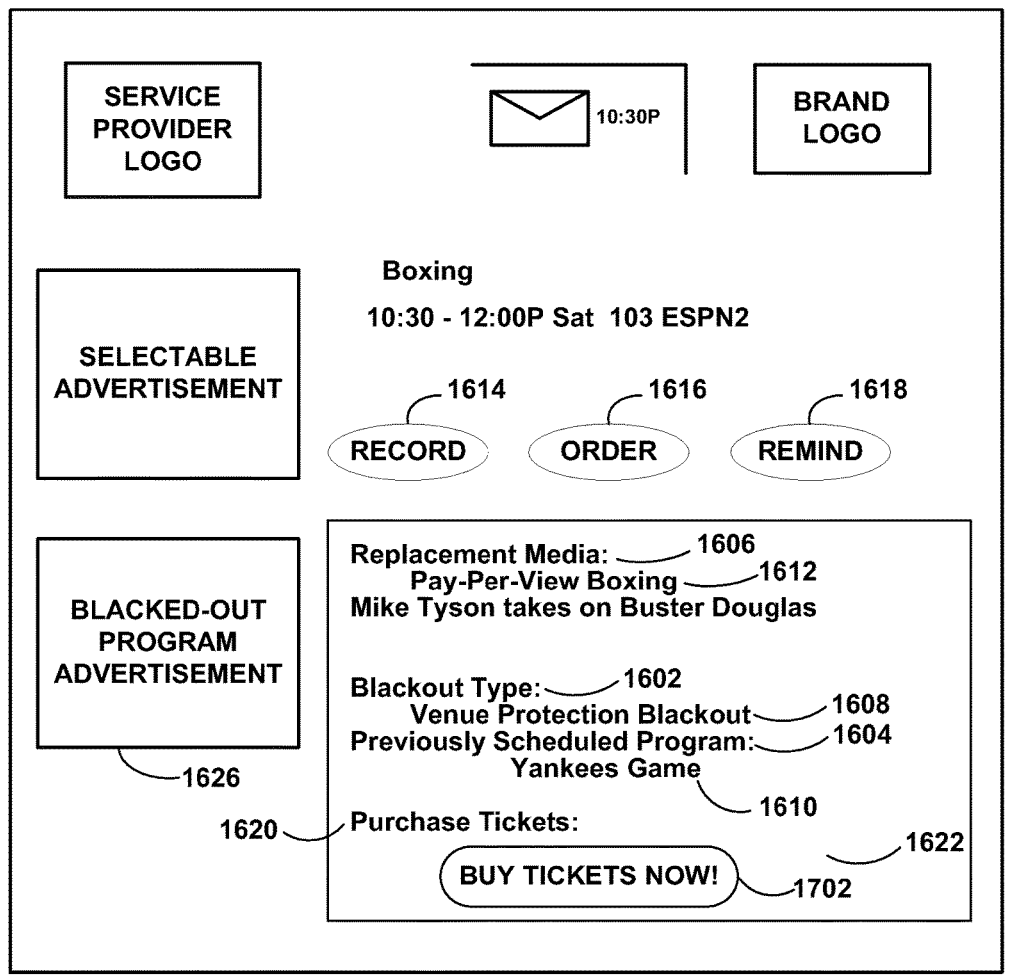

In some embodiments, program guide displays may include interactive options (i.e., user-selectable options) that allow users to purchase tickets for a blacked-out venue event directly from the program guide. For example, FIG. 17 shows another embodiment of an illustrative information display screen that the program guide may display in response to a user selecting program listing "Boxing" 1302 (FIG. 13) to access additional information. In response to the user selecting "BUY TICKETS NOW!" option 1702, the program guide may display program guide display screens that permit a user to complete an order for the blacked-out venue event tickets. In other embodiments, the user may be permitted to input all information required to purchase tickets for the blacked-out venue event in display screen 1700 (e.g., the number of tickets desired, the desired section in which the seats are located, etc.). The program guide may use any suitable method to process user ticket-purchase requests. For example, user television equipment 204 (FIGS. 4, 8, and 9) may send user ticket-purchase requests to an online ticket broker via Internet service system 302 (FIG. 4). In a client-server arrangement, for example, server 502 (FIG. 6) may communicate user ticket-purchase requests to an online ticket broker via Internet service system 302 (FIG. 6). In still another example, user television equipment 204 (FIGS. 2-6, and 8-9) may communicate user ticket-purchase requests to an external information service that processes ticket requests, such as, for example, external information service 110 (FIG. 1).

In some embodiments, the program guide may not display any information that would alert the user that replacement media is replacing a blacked-out program. For example, in the embodiment of FIG. 16, the information, corresponding to elements 1602, 1604, 1606, 1608, 1610, 1620, 1622, 1624, and 1626, that alerts the user that replacement media has replaced a blacked-out program may not be displayed.

Figure 18:
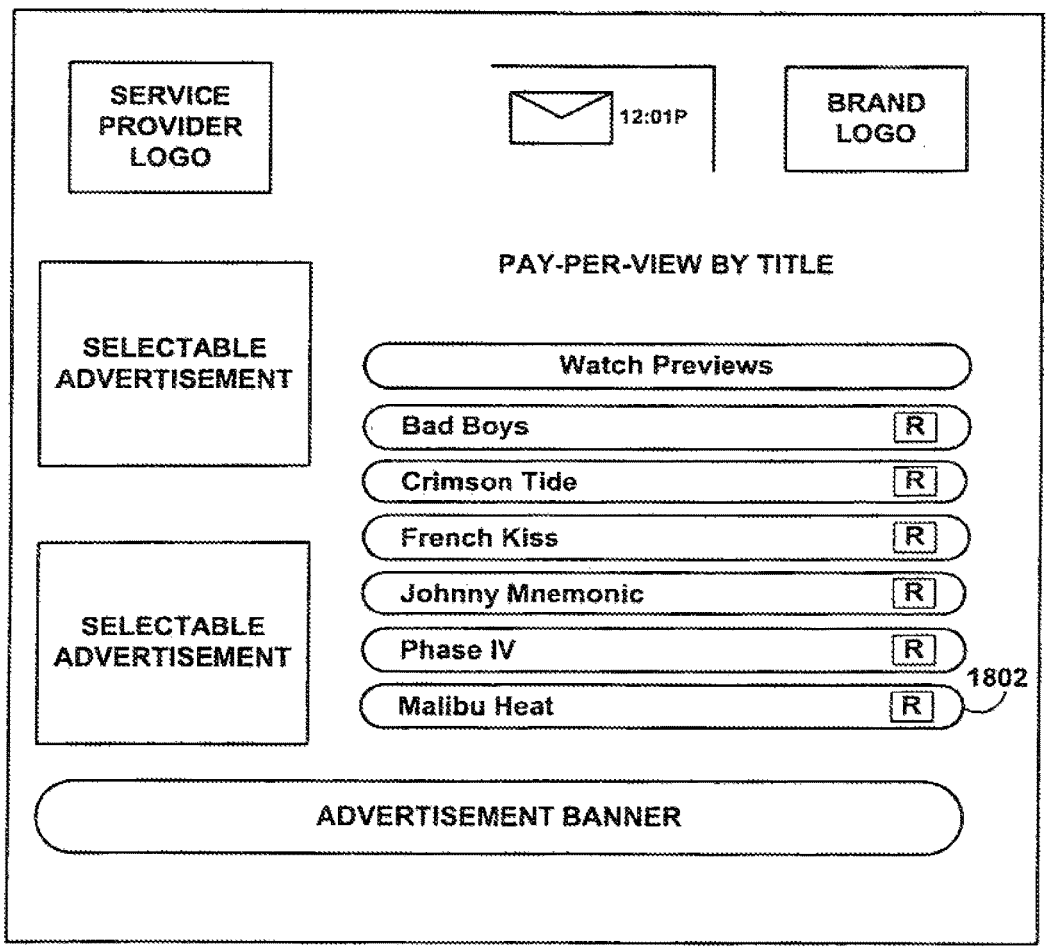
FIG. 18 is an illustrative pay-per-view listings display screen before a pay-per-view program blackout in accordance with one embodiment of the present invention.

In some embodiments, the interactive program guide may update guide pay-per-view display screens to prevent a user from ordering and setting reminder or record options on pay-per-view programs that have been blacked out. FIG. 18 shows an illustrative pay-per-view listings display screen 1800 as it may appear before a blackout. In this example, pay-per-view program "Malibu Heat" 1802 is indicated as available for ordering. If program 1802 becomes unavailable due to a blackout, the program guide may change the display screen to reflect the unavailability of program 1802.

Figure 19:
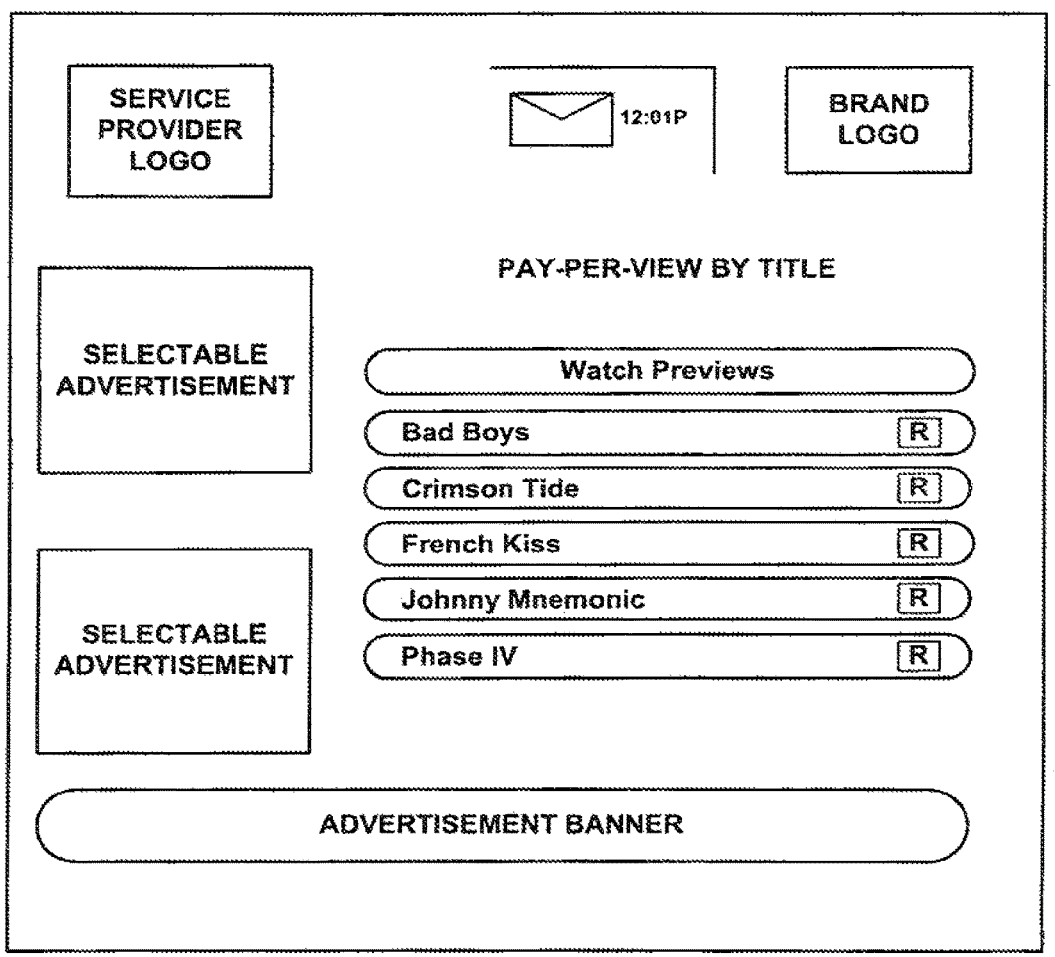
FIGS. 19-20 are illustrative pay-per-view listings display screens after a pay-per-view program blackout in accordance with various embodiments of the present invention.

FIG. 19 shows an illustrative pay-per-view listings display screen 1900 after pay-per-view program "Malibu Heat" 1802 (FIG. 18) has been blacked out. In this example, the program guide has removed the listing for "Malibu Heat" 1802 from the list of available pay-per-view programs. The program guide may have, for example, removed program 1802 (FIG. 18) from the list of available programs. The guide may remove blacked-out pay-per-view programs based on, for example, an invalid purchase price or a blackout flag having been associated with program 1802 to reflect its unavailability. Removing a blacked-out program from the list of available programs may prevent a user from ordering or setting a reminder for the blacked-out program.

Figure 20:
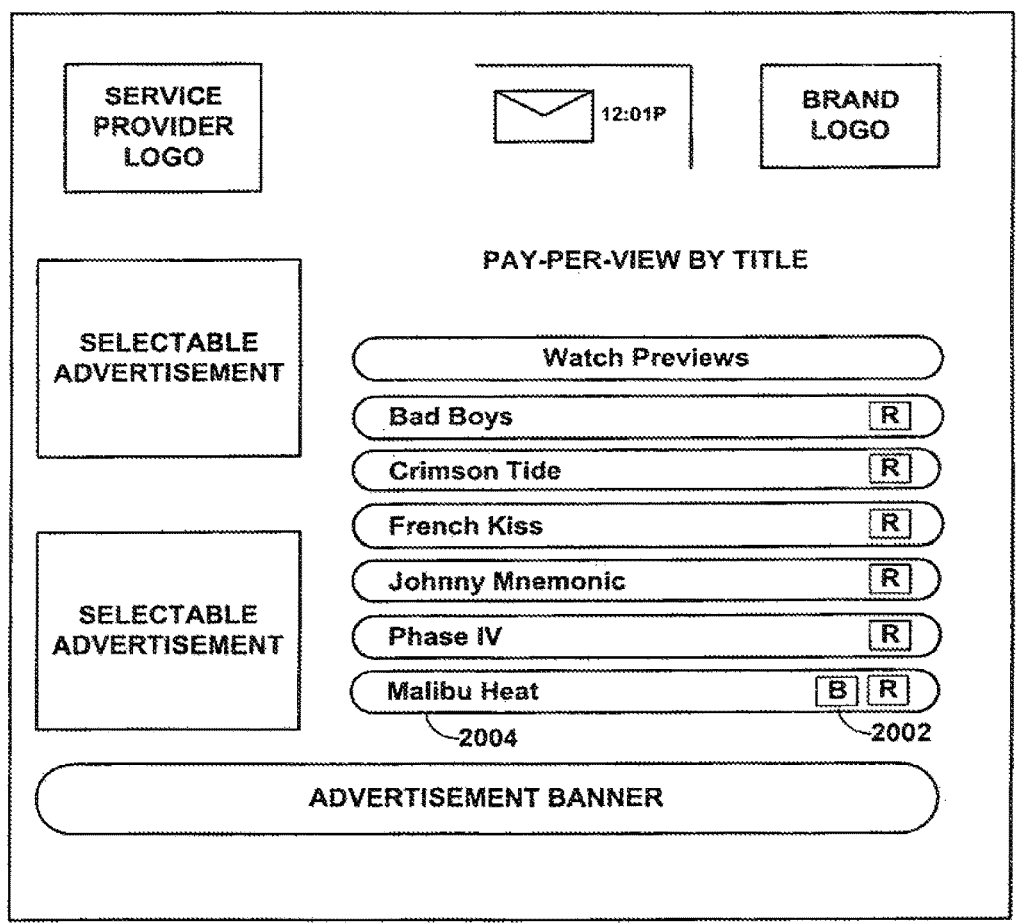

FIG. 20 shows another illustrative embodiment of a pay-per-view listings screen after program "Malibu Heat" 1802 (FIG. 18) has been blacked out. In display screen 2000, indicator 2002 may indicate that program "Malibu Heat" 2004 is blacked out. In response to user-selection of program 2004, the program guide may display program guide screens that provide additional blackout features and options.

Figure 21:
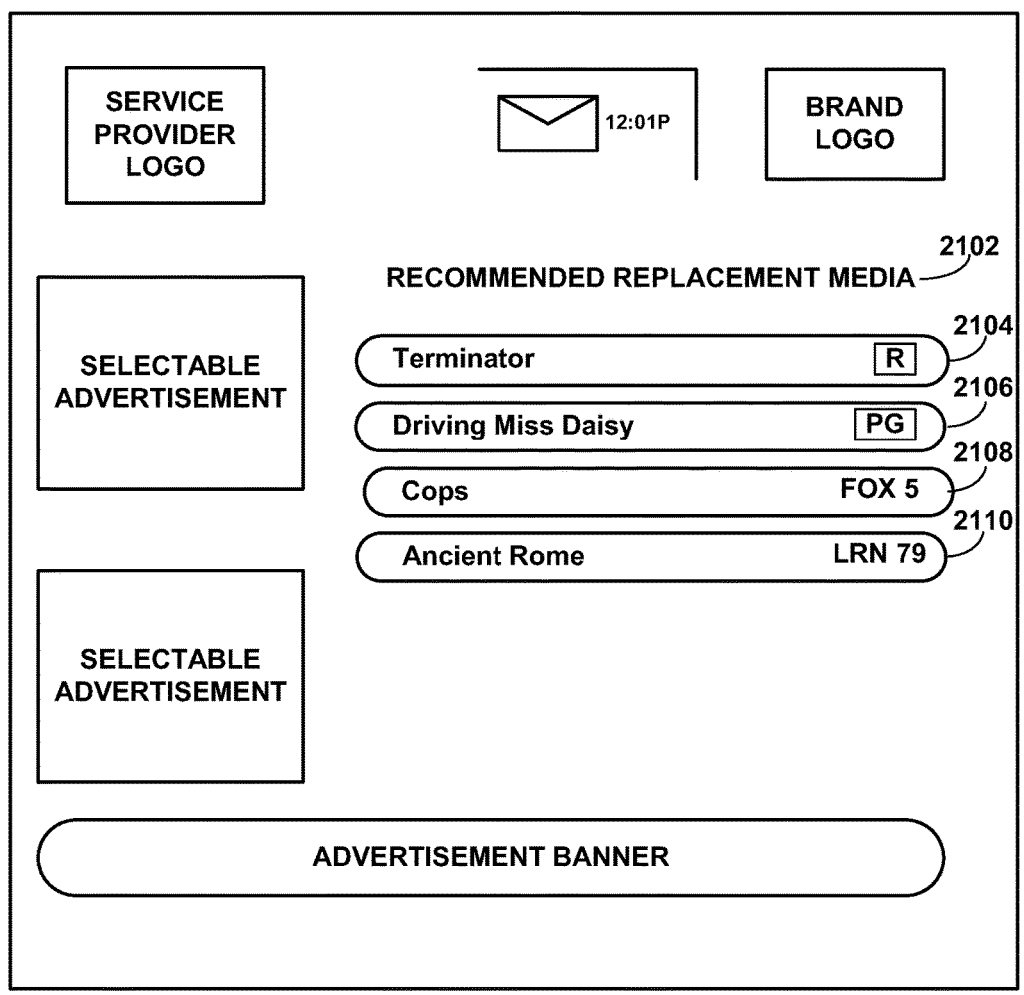
FIG. 21 is an illustrative recommended replacement media display screen in accordance with one embodiment of the present invention.

FIG. 21 shows an illustrative blackout information display screen that may be displayed by the program guide in response to user selection of blacked-out program 2004 (FIG. 20). In display screen 2100, the program guide may provide a list of recommended replacement media 2102. For example, the program guide may recommend pay-per-view programs "Terminator" 2104 and "Driving Miss Daisy" 2106, and television programs (i.e., non pay-per-view programs) "Cops" 2108 and "Ancient Rome" 2110. In some embodiments, the program guide may recommend replacement media that has similar program attributes as a blacked-out program. For example, blacked-out program "Malibu Heat" 2004 (FIG. 20) and recommended programs "Terminator" 2104 and "Cops" 2108 may all be police-force related programs. In some embodiments, the program guide may recommend media that is user-targeted. For example, the program guide may recommend program "Ancient Rome" 2110 because it has similar attributes as a user viewing history that is maintained by the program guide. In some embodiments, the program guide may recommend replacement media in attempts to increase pay-program derived revenue. For example, the program guide may recommend pay-per-view program "Driving Miss Daisy" 2106 because it has demonstrated popularity with other program guide subscribers.

Figure 22A:
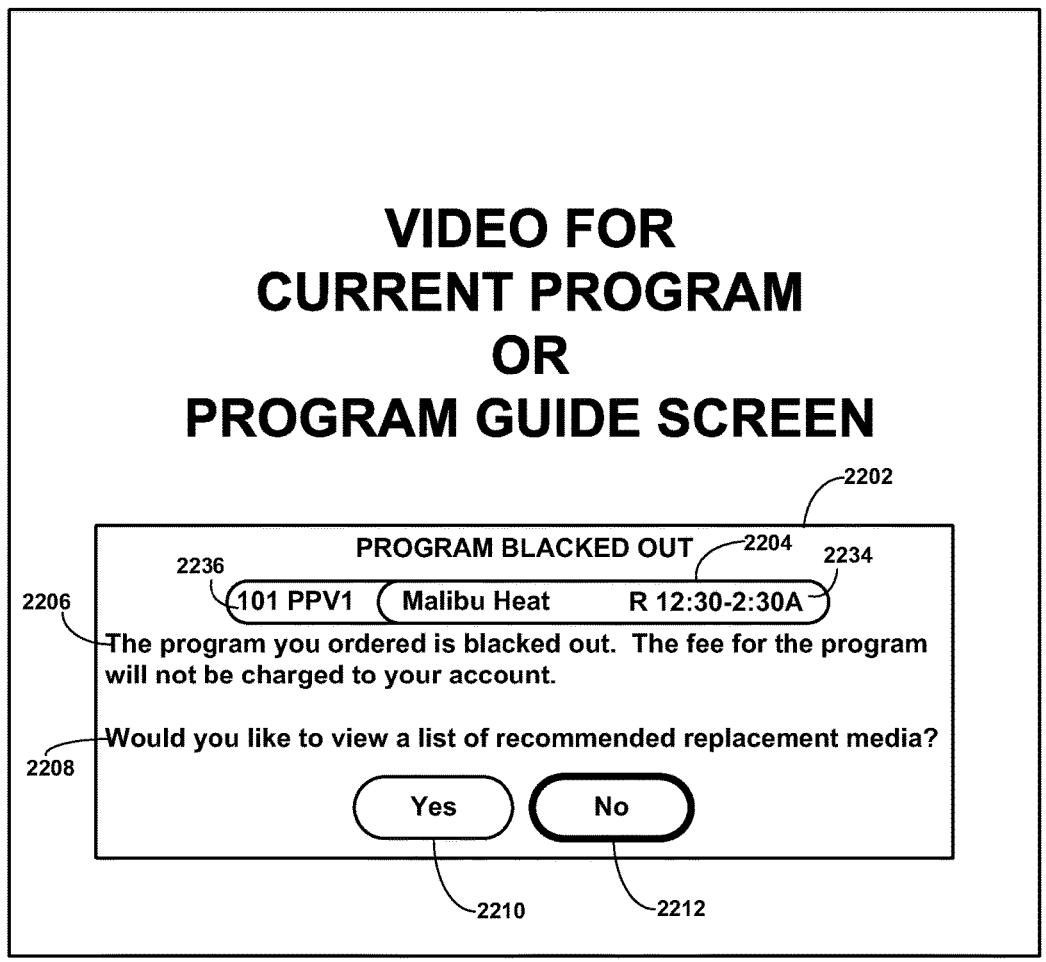
FIG. 22a is an illustrative blackout information overlay screen in accordance with one embodiment of the present invention.

In some embodiments, the program guide may provide features for pay-per-view programs that are blacked-out after a user has ordered the pay-per-view programs. For example, FIG. 22a shows an illustrative program guide overlay 2202 that may be displayed when pay-per-view program "Malibu Heat" 2204 is blacked out after a user has ordered program 2204. In response to the blackout of previously ordered program 2204, the program guide may provide blackout information in overlay 2202. Overlay 2202 may be displayed over video for a current program or over a currently accessed program guide display screen. Particularly, information in overlay 2202 may inform the user that pay-per-view program 2204 is blacked out and that the fee for the program will not be charged to the user's account 2206. In addition, overlay 2202 may include an option to view a list of recommended replacement media 2208. In response to user selection of "Yes" option 2210, the program guide may display a list of recommended replacement media (e.g., the list of replacement media in the display screen of FIG. 21). In response to user selection of "No" option 2212, the program guide may remove overlay 2202 from the video of the current program or the currently accessed program guide screen. In other embodiments, the program guide may provide a list of recommended replacement media in overlay 2202.

Figure 22B:
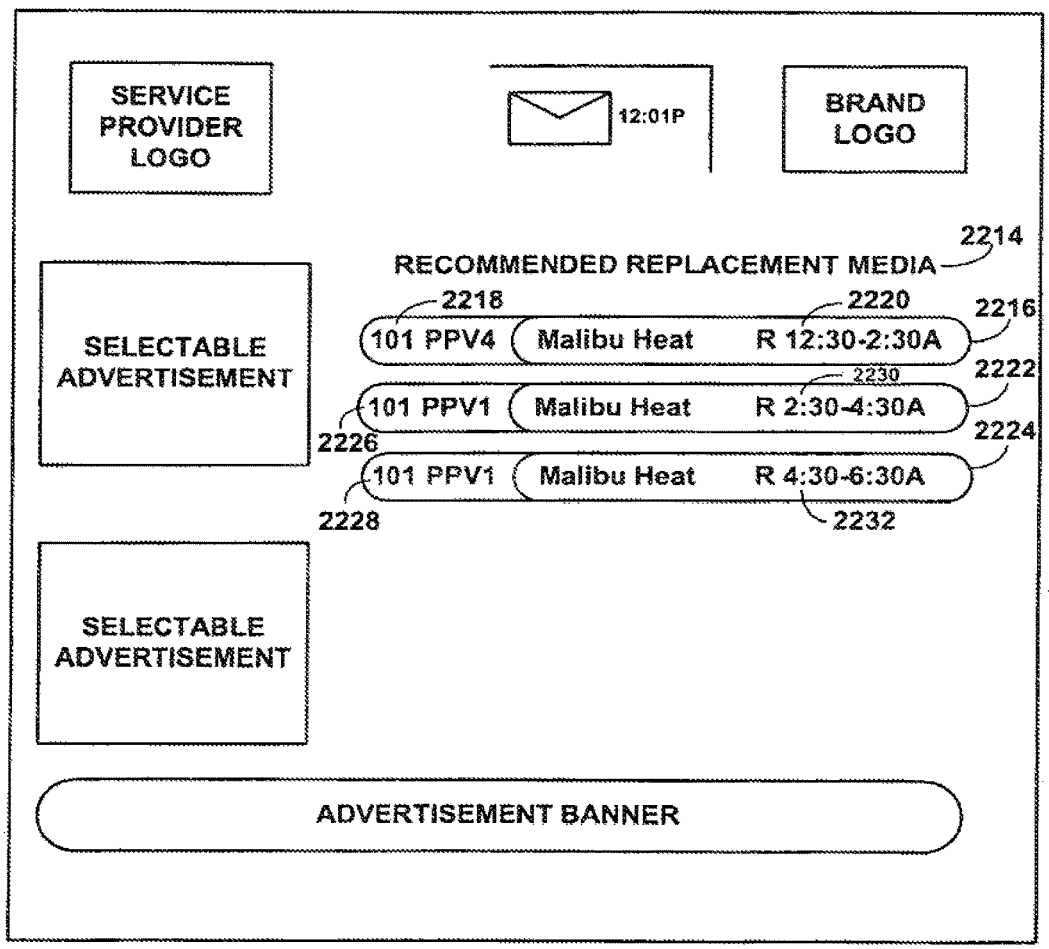
FIG. 22b is an illustrative recommended replacement media display screen in accordance with one embodiment of the present invention.

In some embodiments, the program guide may provide a list of replacement media that indicate a different showing for the blacked-out program (i.e., the same program but on a different channel or at a different time). FIG. 22b shows an illustrative recommended replacement media display screen 2201. A list of other program times and channels for which a blacked-out program is available may be displayed under heading "RECOMMENDED REPLACEMENT MEDIA" 2214. In this example, display screen 2201 may be displayed in response to a user selecting "Yes" option 2210 (FIG. 22a) to "view a list of recommended replacement media" 2208 (FIG. 22a) for blacked-out program "Malibu Heat" 2204 (FIG. 22a). In this example, other program times and channels for which blacked-out program "Malibu Heat" 2204 (FIG. 22a) is available may be displayed under heading 2214. For example, program listing 2214 may indicate that program "Malibu Heat" is available on a different channel 2218 and at the same time 2220 as blacked-out program "Malibu Heat" 2204 (FIG. 22a). As another example, program listings 2222 and 2224 may indicate that program "Malibu Heat" is available on the same channel 2226 and 2228 and at different times 2230 and 2232, respectively, as blacked-out program "Malibu Heat" 2204 (FIG. 22a). In other embodiments, display screen 2201 may be displayed in response to user-selection of an option to view a list of other showings for which the program of a blacked-out program is available. In response to user-selection of program 2216, 2222, or 2224, a user may be permitted to order program 2216, 2222, or 2224, respectively.

In some embodiments, the program guide may automatically order pay-program replacement media for blacked-out pay-programs. For example, the program guide may automatically order program "Malibu Heat" 2216 for the user in response to a blackout of program "Malibu Heat" 2204 (FIG. 22a). The program guide may automatically order program 2216 for the user because program 2216 is a different showing of program 2204 (FIG. 22a). Particularly, programs 2216 and 2204 are both "Malibu Heat", programs 2216 and 2204 are both scheduled at "12:30-2:30 A" (2234, 2220), and program 2216 is showing on channel "104 PPV4" 2218 that is different from channel "101 PPV1" 2236 (FIG. 22a) of blacked-out program 2204.

Figure 23:
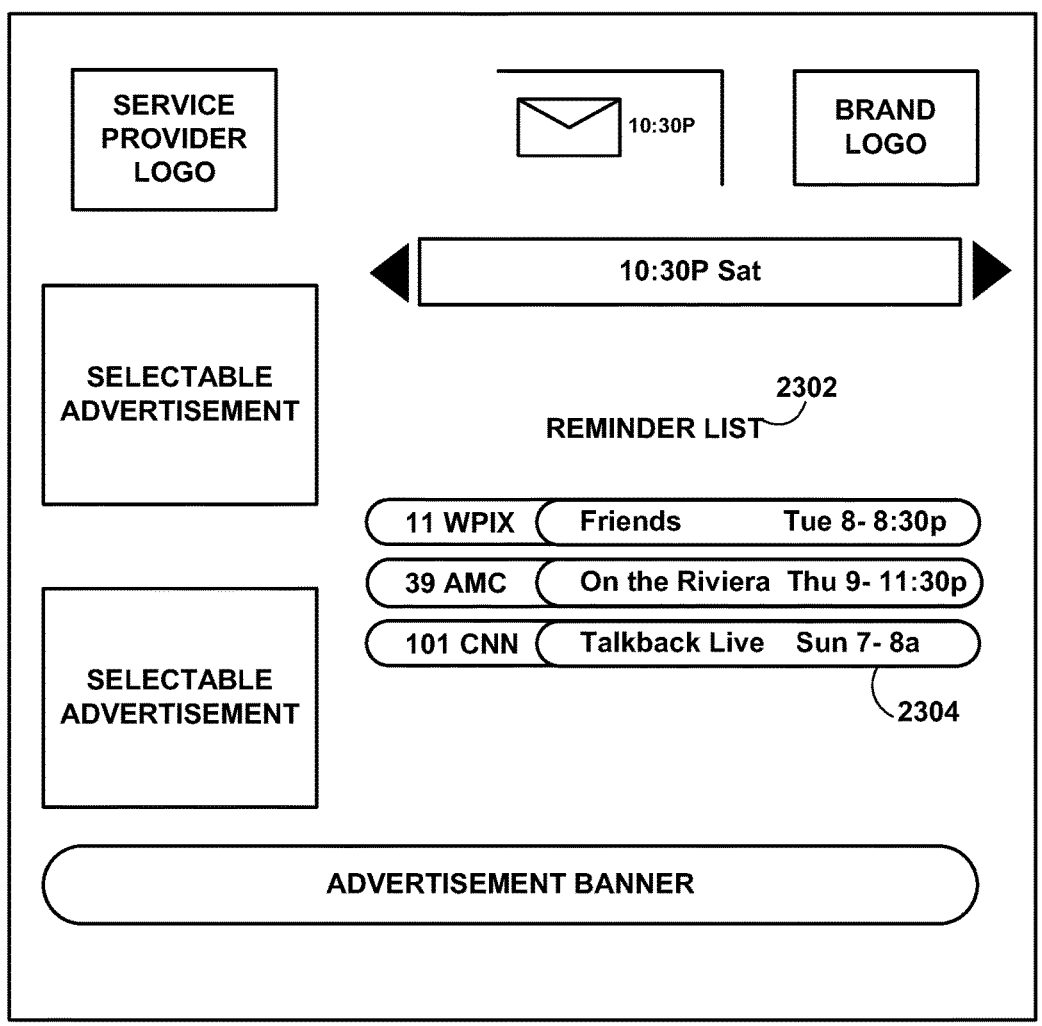
FIG. 23 is an illustrative reminder list display screen before a blackout in accordance with one embodiment of the present invention.

In some embodiments, the interactive program guide may update reminder lists in response to programming blackouts. FIG. 23 shows an illustrative reminder list display screen 2300. A list of programs for which reminders have been set may be displayed under heading "Reminder List" 2302. In this example, a reminder for program "Talkback Live" 2304 has been set by a user. If program 2304 is blacked out, the program guide may change the reminder list to reflect the blackout by, for example, removing the listing for the reminder of program "Talkback Live" 2304 from the reminder list.

Figure 24:
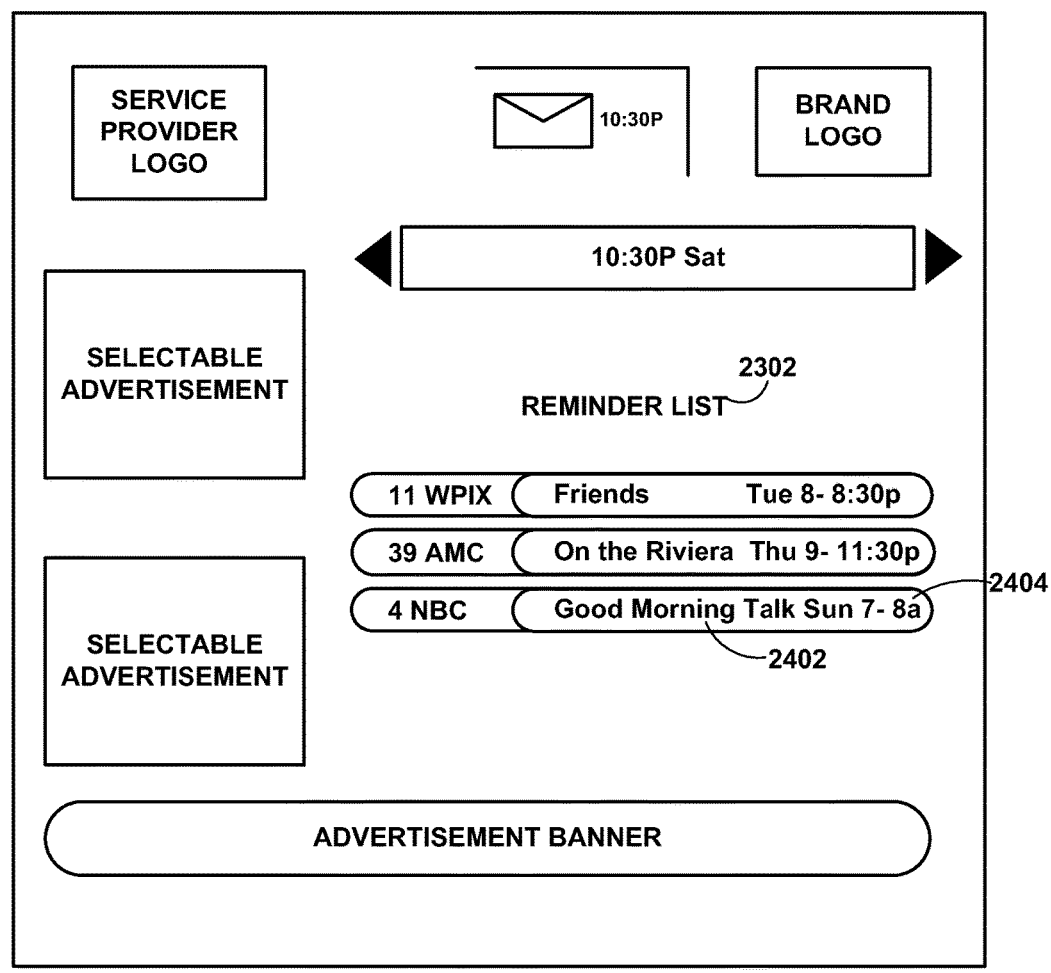
FIG. 24 is an illustrative reminder list display screen after a blackout in accordance with one embodiment of the present invention.

In some embodiments, the interactive program guide may automatically replace program "Talkback Live" 2304 with replacement media. As shown in FIG. 24, for example, the program guide may replace program "Talkback Live" 2304 (FIG. 23) with "Good Morning Talk" 2402 which is showing during the same time period 2404. Program 2402 may have similar program attributes (e.g., genre, actors, etc.) as program 2304 (FIG. 23). Particularly, programs 2304 and 2402 may both be talk show programs. In some embodiments, the program guide may automatically replace a blacked-out program on the reminder list with replacement media that is another showing of the blacked-out program (i.e., the same program on a different channel or at a different time). In some approaches, the interactive program guide may automatically set reminders for programs based on a user's viewing history, or based on an alternate selection set by the user to replace blacked-out program 2304 (FIG. 23) in the event of a blackout. In some embodiments, the program guide may provide a user with an option to view a list of recommended replacement media when a program on the reminder list is blacked-out.

Figure 25:
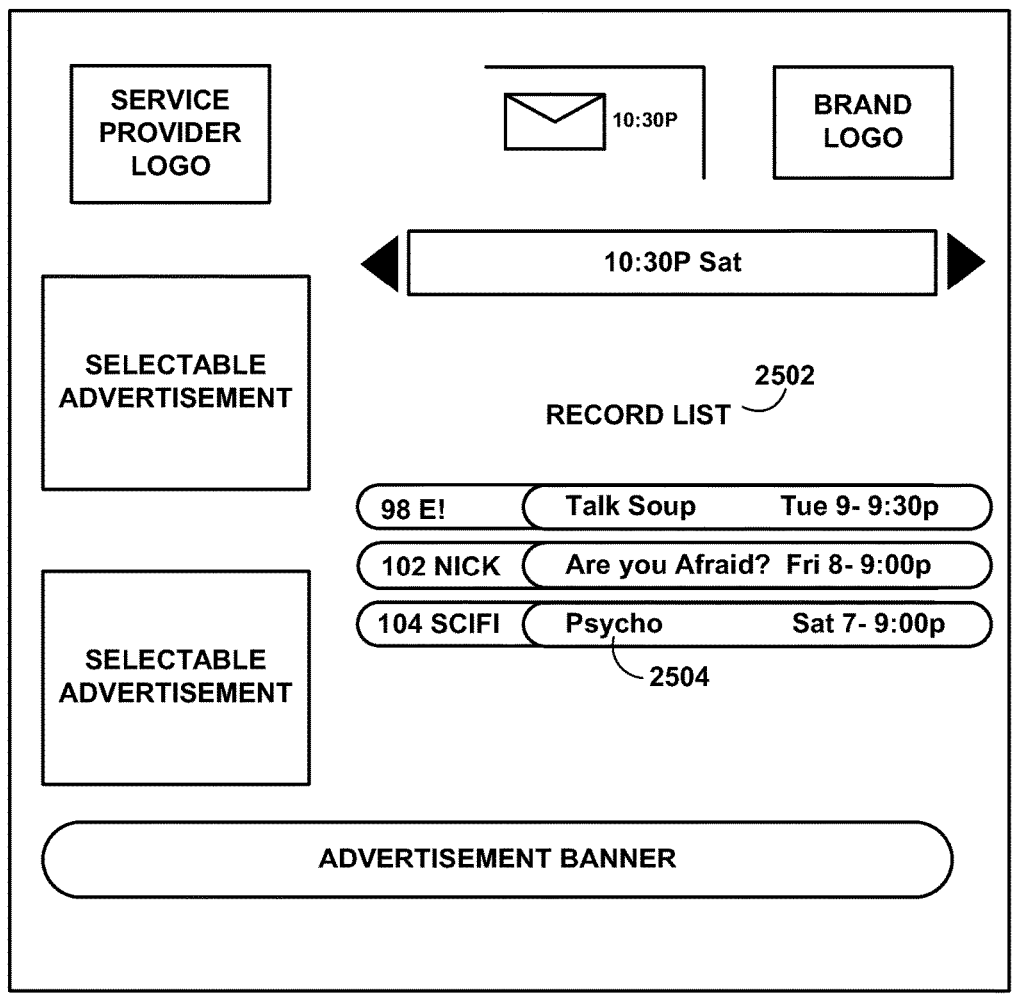
FIG. 25 is an illustrative record list display screen before a blackout in accordance with one embodiment of the present invention.

In some embodiments, the program guide may update record lists in response to program blackouts. FIG. 25 shows an illustrative record list display screen 2500. A list of programs scheduled for recording may be displayed under heading "Record List" 2502. In this example, program "Psycho" 2504 has been scheduled for recording. If program 2504 is blacked out, the program guide may change the record list to reflect the blackout. For example, the guide may remove "Psycho" 2504 from the record list to prevent the recording of an unavailable program.

Figure 26:
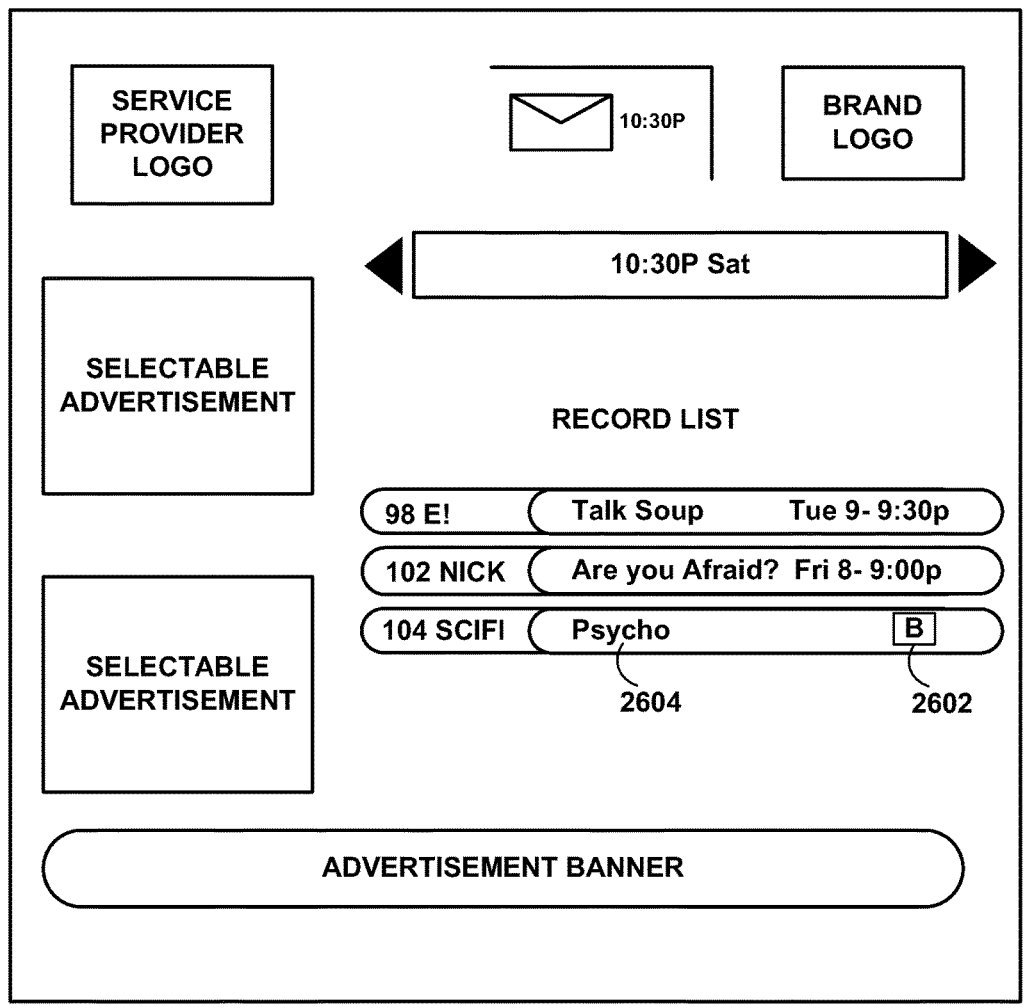
FIG. 26 is an illustrative record list display screen after a blackout in accordance with one embodiment of the present invention.
Figure 27:
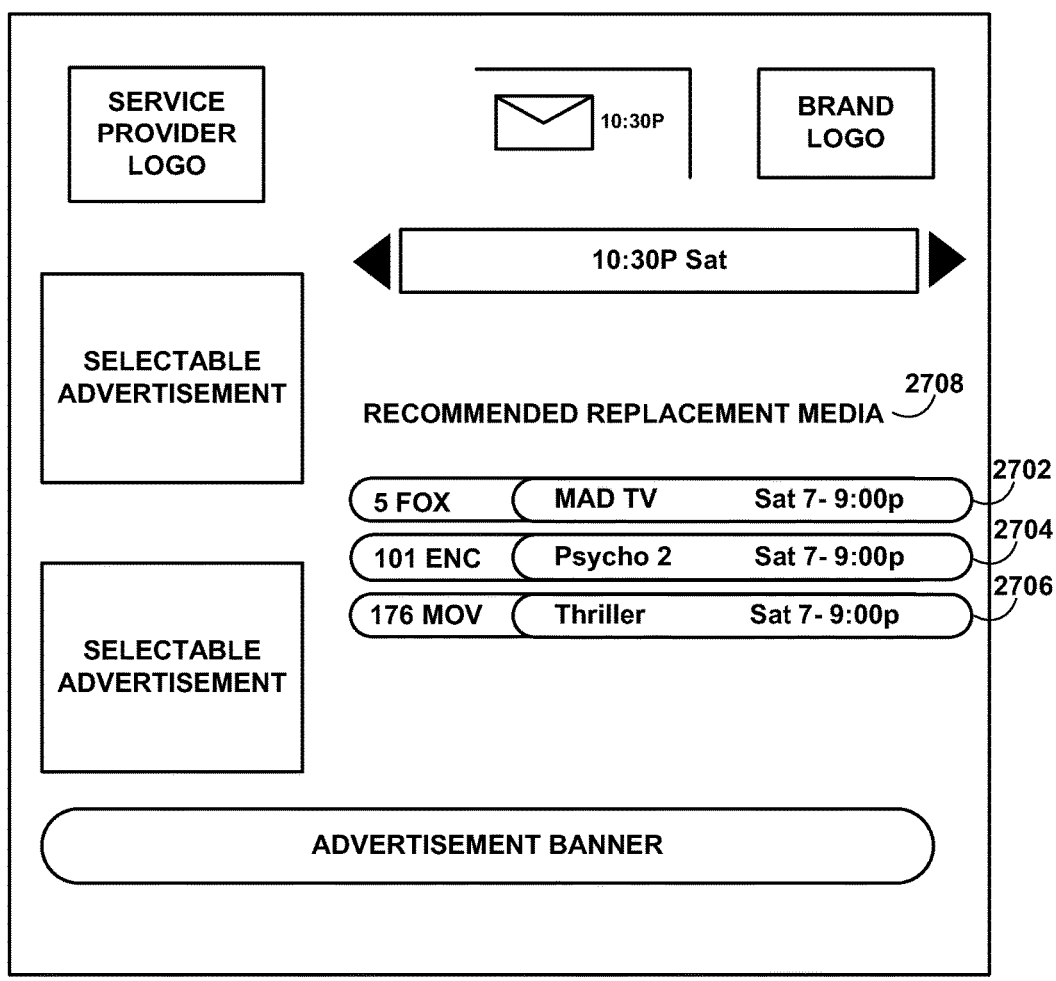
FIG. 27 is an illustrative recommended replacement media display screen in accordance with one embodiment of the present invention.

In other embodiments, for example, the program guide may display indicator 2602 to indicate that program "Psycho" 2604 has been blacked out, as shown in display screen 2600 of FIG. 26. The program guide may provide the user with blackout information and features in response to user selection of blacked-out program 2604 (FIG. 26). For example, the interactive program guide may display a list of optional replacement programs for a user, as shown, for example, in display screen 2700 of FIG. 27. Particularly, program "MAD TV" 2702, program "Psycho 2" 2704, and program "Thriller" 2706 may be available under heading "RECOMMENDED REPLACEMENT MEDIA" 2708. The program guide may recommend, for example, program 2702 because, for example, it is a program normally watched or recorded by the user. The program guide may recommend programs 2704 and 2706 because, for example, they have similar program attributes as blacked-out program 2604 (FIG. 26). Particularly, programs 2704 and 2604 (FIG. 26) may be directed by the same director or may have the same actors, and programs 2706 and 2604 (FIG. 26) may both be horror programs. In some embodiments, the program guide may recommend replacement media that is a different showing of a blacked-out program (i.e., available on a different channel or at a different time). In some embodiments, the program guide may automatically select replacement media for recording.

Figure 28:
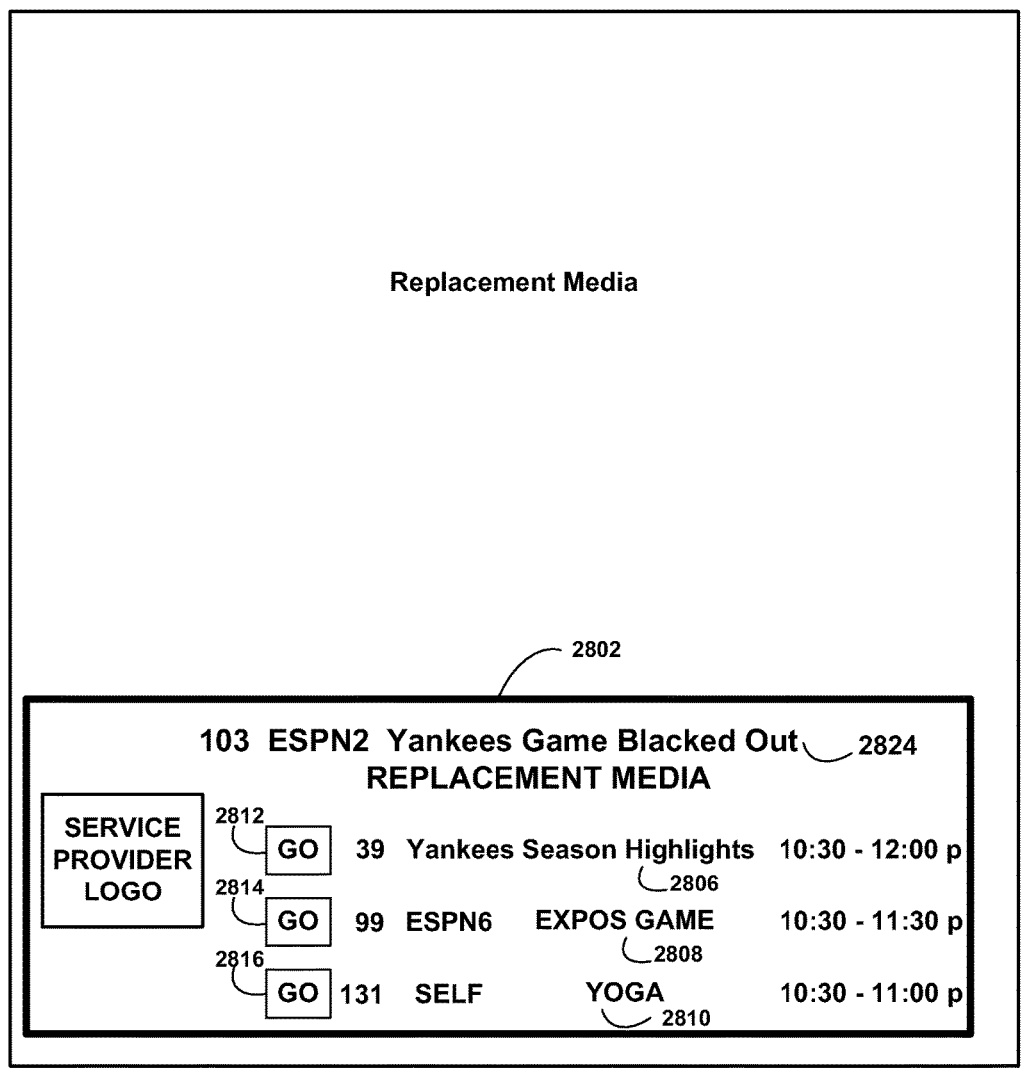
FIG. 28 is an illustrative FLIP display screen in accordance with one embodiment of the present invention.

In some embodiments, the interactive program guide may provide FLIP display screens in response to a user changing channels. FIG. 28 is an illustrative flip display screen 2800 in accordance with one embodiment of the present invention. The program guide may overlay flip bar 2802 over a blank screen or replacement media in response to a user tuning to a channel on which a program has been blacked out. Flip bar 2802 may provide blackout information and features to a program guide user. For example, flip bar 2802 may indicate that program "Yankees Game" 1008 (FIG. 10) is blacked out using an indicator such as, for example, "Yankees Game Blacked Out" 2804. The program guide may recommend replacement media in FLIP overlay 2802. In this example, the program guide may recommend replacement media "Yankees Season Highlights" 2806, "Expos Game" 2808, and "Yoga" 2810 in overlay 2802. The user may access each of these programs by, for example, selecting "Go" option 2812, 2814, or 2816, respectively. The program guide may recommend programs using any suitable approach. For example, programs may be recommended because they have similar program attributes as a blacked-out program. In this example, program "Expos Game" 2808 may be recommended because it has similar program attributes (e.g., sports-related) as the blacked-out program "Yankees Game" 1008 (FIG. 10). As another example, programs may be recommended based on a user's viewing habits. In this example, the program guide may have recommended program "Yoga" 2810 because it is a program that the user frequently watches. Still another example, programs may be recommended because they are intended to replace the programs that are blacked out. In this example, the program guide may have recommended program "Yankees Season Highlights" 2806 to replace a venue protection blackout of program "Yankees Game" 1008 (FIG. 10). Recommended program 2806 may be replacement media provided to the program guide by the Yankees team front office or any other suitable source (e.g., an Internet website accessed by Internet service system 302 (FIG. 3,4, or 6) or Internet service system 710 (FIG. 7)) that is intended to replace blacked-out program 1008 (FIG. 10).

Figure 29:
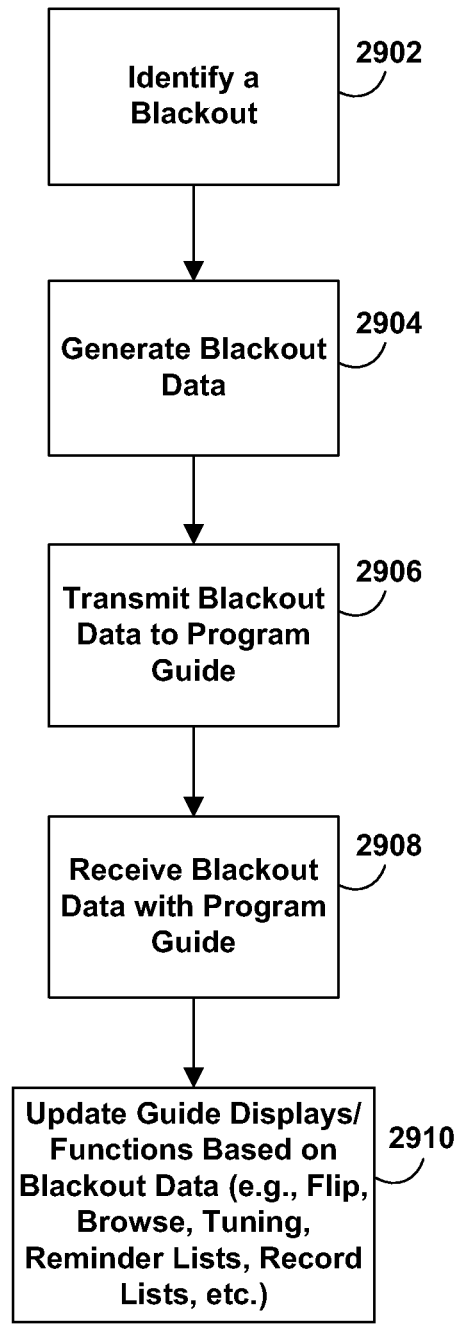
FIG. 29 is an illustrative flowchart describing a method of supporting blackout features in an interactive program guide system in accordance with one embodiment of the present invention.

FIG. 29 is a generalized flowchart of an illustrative method for supporting blackout features in an interactive program guide in accordance with one embodiment of the present invention. At step 2902, a blackout may be identified. Blackouts may be identified, for example, by main facility 102 (FIG. 1), external information service 110 (FIG. 1), Internet service system 302 (FIGS. 3, 4 and 6), Internet service system 704 (FIG. 7), distribution facility 202 (FIGS. 2-6), distribution facility 708 (FIG. 7), server 502 (FIGS. 5-6) or any other suitable facility or equipment, depending on the chosen program guide implementation. For example, main facility 102 may identify blackout data in transmissions from external information service 110 (FIG. 1) (e.g., a sports team or television station front office). As another example, distribution facility 202 (FIGS. 2-6) or distribution facility 708 (FIG. 7) may identify a blackout when a program with an increased bandwidth requirement is scheduled to be broadcast (e.g., bandwidth blackout of a neighboring channel). Still another example, Internet service system 302 (FIGS. 3,4, and 6) or Internet service system 704 (FIG. 7) may identify blackout data on an Internet source, such as on a sports team website.

Blackout data may be generated at step 2904. Blackout data may be any data related to a blackout that may be used by the interactive program guide to provide programming blackout features. Any suitable facility, service, or location may generate programming blackout data. For example, an operator at main facility 102 may manually enter listing information for the blackout into a program guide database. As another example, external information service 110 (FIG. 1) (e.g., a sports team front office) may generate ticket purchase information for a venue protection blackout. Still another example, user television equipment 204 (FIGS. 2-6, and 8-9) or server 502 (FIGS. 5-6) may generate blackout data by retrieving replacement media from a program guide database. Still another example, external information service 110 (FIG. 1) may generate blackout data by creating replacement media (e.g., a sports team front office editing a highlight film that is displayed when a sporting event is blacked out). Yet another example, the program guide running on server 502 (FIGS. 5-6) or user television equipment 204 (FIGS. 2-6, and 8-9) may generate a set of replacement media recommendations for a blacked-out program based on user viewing habits. Still another example, the program guide running on server 502 (FIGS. 5-6) or user television equipment 204 (FIGS. 2-6, and 8-9) may generate blackout data for an affiliate protection blackout when a local affiliate channel and a national channel have scheduled the same program.

In some embodiments, the facility or location that generates the blackout data may be the same facility or location that identifies the blackout. For example, distribution facility 202 (FIGS. 2-6) or distribution facility 708 (FIG. 7) may identify a fast-paced sporting event that requires additional bandwidth and may generate program guide blackout data that indicates program guide display screen changes. In another example, the program guide running on set-top box 804 (FIG. 8) may identify that the same program is scheduled to be broadcast on a national channel and a local affiliate channel and may generate blackout data that indicates an affiliate protection blackout. Still another example, the program guide running on user television equipment 204 (FIGS. 2-6, and 8-9) may identify that an invalid purchase price has been set for a blacked-out pay-per-view program by server 502 (FIGS. 5-6), main facility 102 (FIG. 1), external information service 110 (FIG. 1), Internet service system 302 (FIGS. 3, 4, and 6), or other facility and may generate a list of recommended replacement media for the program.

In other embodiments, a first facility may identify a blackout and a second facility may generate the programming blackout data. For example, a television station headquarters or sports franchise may fax a list of programs or events that will not be broadcast to distribution facility 202 (FIGS. 2-6) or to distribution facility 708 (FIG. 7), and an operator at distribution facility 202 or distribution facility 708 may manually enter the data into a program guide database. As another example, server 502 (FIG. 6) may convert data from an Internet webpage (e.g., accessed via Internet service provider 302 (FIG. 6)) into program guide blackout data. Still another example, main facility 102 (FIG. 1) may transmit blackout data from multiple external information services 110 (FIG. 1) to application equipment 106 (FIGS. 1-7) in a single transmission.

At step 2906, programming blackout data may be transmitted to the program guide. Transmission may depend on, for example, where the blackout data was created and on the arrangement of the system. For example, if external information service 110 (FIG. 1) generates programming blackout data, external information service 110 may transmit the data to main facility 102 (FIG. 1). Main facility 102 may then transmit the data to interactive application equipment 112 (FIGS. 1-7). As another example, server 502 (FIGS. 5-6) may provide blackout data to a guide client (e.g., user television equipment 204 (FIGS. 5-6, and 8-9)) upon request by the client. Still another example, distribution facility 202 (FIGS. 2-6) may transmit replacement media to user televison equipment 202 (FIGS. 2-6) for storage in the event that a blackout occurs. In yet another example, Internet service system 302 (FIGS. 3,4, and 6) may transmit blackout data to user televison equipment 204, distribution facility 202, or other suitable facility, or may transfer blackout data from one Internet location to another Internet location, such as from a sports team website to a program guide website.

At step 2908, programming blackout data is received by the interactive program guide system. For example, a user television equipment 204 program guide client may extract blackout data from, for example, carousel-based transmissions of server 502 (FIGS. 5-6). As another example, server 502 (FIGS. 5-6) may receive blackout data from main facility 102 (FIG. 1), external information service 110 (FIG. 1), Internet service system 302, or other facility. Still another example, main facility (FIG. 1) may receive stored blackout data from program guide data source 104 (FIG. 1). Note that in instances in which the program guide (e.g., the program guide running on user television equipment 204 (FIGS. 1-4, 8, and 9)) generates blackout data (e.g., generates control data that instructs set-top box 804 (FIG. 8) to tune to a local affiliate channel in response to user selection of a national channel based the program guide observing a similarity in the program schedules of the local affiliate and the national channel), steps 2906 and 2908 of the method of FIG. 29 may not be necessary. Particularly, in instances in which the program guide generates blackout data, the method for supporting blackout features in an interactive program guide may not have separate steps for transmitting blackout data to and receiving blackout data with the program guide.

At step 2910, the program guide may use the blackout data to provide blackout features. For example, server 502 (FIGS. 5-6), user televison equipment 204 (FIGS. 2-6, and 8-9), Internet service system 302 (FIGS. 3,4, and 6), Internet service system 704 (FIG. 7), external information service 110 (FIG. 1), or other program guide equipment may generate program guide screens that include blackout data and provide blackout features. The program guide may, for example, automatically tune to a local affiliate channel (e.g., when a national channel with a blacked-out program is accessed by a user), tune to a dedicated channel that contains replacement media, access an Internet site that provides ticket purchase information (e.g., for a venue protection blackout), or display other program guide display screens in response to a user selecting a blacked-out program.

In some embodiments, the blackout features provided by the program guide may depend on the amount of time that remains before a blackout. For example, the program guide running on user televison equipment 204 (FIGS. 2-6, and 8-9), server 502 (FIGS. 5-6), or other program guide equipment that generates program guide display screens, may generate display screens having eye-catching blackout indicators or icons for blackouts that will occur within a given time period (e.g., immediately, within the hour, within the day) as opposed to more subdued indicators or icons for blackouts that will occur within another time period (e.g., more than a week away). As another example, Internet service system 302 (FIGS. 3,4, and 6) or other equipment may email a user with a blackout notice for programs that will be blacked out within a given time period.

Figure 30:
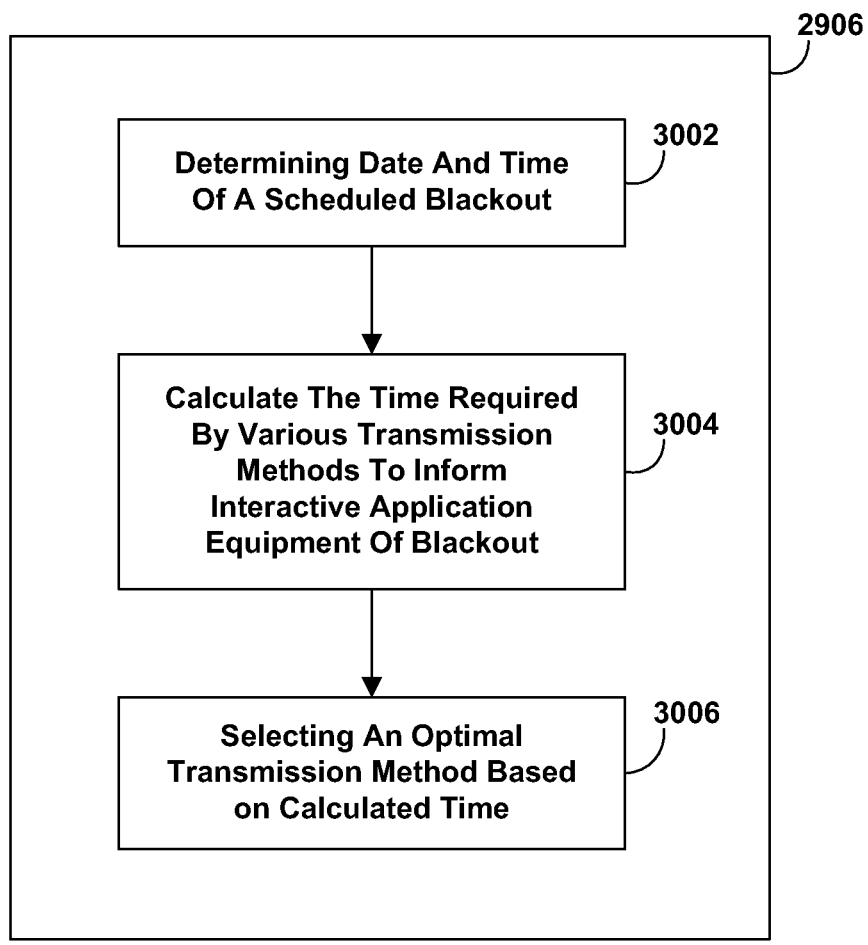
FIG. 30 is an illustrative flowchart describing a general method for supporting blackouts in accordance with one embodiment of the present invention.

In some embodiments, the amount of advance notice given for a blackout may determine the method of blackout data transmission used by the program guide. Turning to FIG. 30, illustrative substeps of step 2906 of FIG. 29 are shown. At step 3002, the date and time of a scheduled blackout may be identified. For example, an operator at main facility 102 (FIG. 1) may read the dates and times of blackouts from a televison station front-office email. As another example, the program guide running on server 502 (FIGS. 5-6) may process blackout data sent from main facility 102 (FIG. 1), Internet service system 302 (FIGS. 3, 4, and 6), external information service 110 (FIG. 1), or other suitable facility or location. The approximate amount of time that various transmission methods require to effectively inform necessary portions of the interactive program guide system may be calculated at step 3004. Based on blackout information and the time required to provide the information using various transmission methods, an optimal transmission method may be chosen at step 3006. For example, a computer at main facility 102 (e.g., program guide data source 104) may choose the method which may not only provide blackout data in a timely fashion but may also take cost and resource (e.g., bandwidth) issues into account. For a blackout known well in advance, main facility 102 (FIG. 1) may include blackout data in regular schedule localization transmissions as opposed to sending separate transmissions, despite the fact that both methods may effectively provide accurate program guide data to the interactive program guide application. As another example, server 502 (FIGS. 5-6) may provide blackout data in a carousel-based approach as opposed to, for example, upon user request, when a blackout is scheduled to occur with a short time period of the present time. Still another example, external information service 110 (FIG. 1), main facility 102 (FIG. 1), Internet service provider 302 (FIGS. 3, 4, and 6), or other facility or location may transmit blackout data directly to user television equipment 204 (FIGS. 2-6, and 8-9) when a program is scheduled to be blacked out within a given time period (e.g., immediately, within that hour, within that day, etc.).

In some embodiments, main facility 102 (FIG. 1), distribution facility 204 (FIGS. 2-6), server 502 (FIGS. 5-6), Internet service system 302 (FIGS. 3, 4, and 6) or other facility or location may, when there is sufficient time before a blackout, delay the transmission of blackout data until complete blackout data is obtained. For example, main facility 102 may delay transmission of blackout data to interactive application equipment 106 (FIGS. 1-7) until the blackout type, blackout channel and time, availability of replacement media, recommended program lists, and other blackout data are identified for the blackout.

Figure 31:
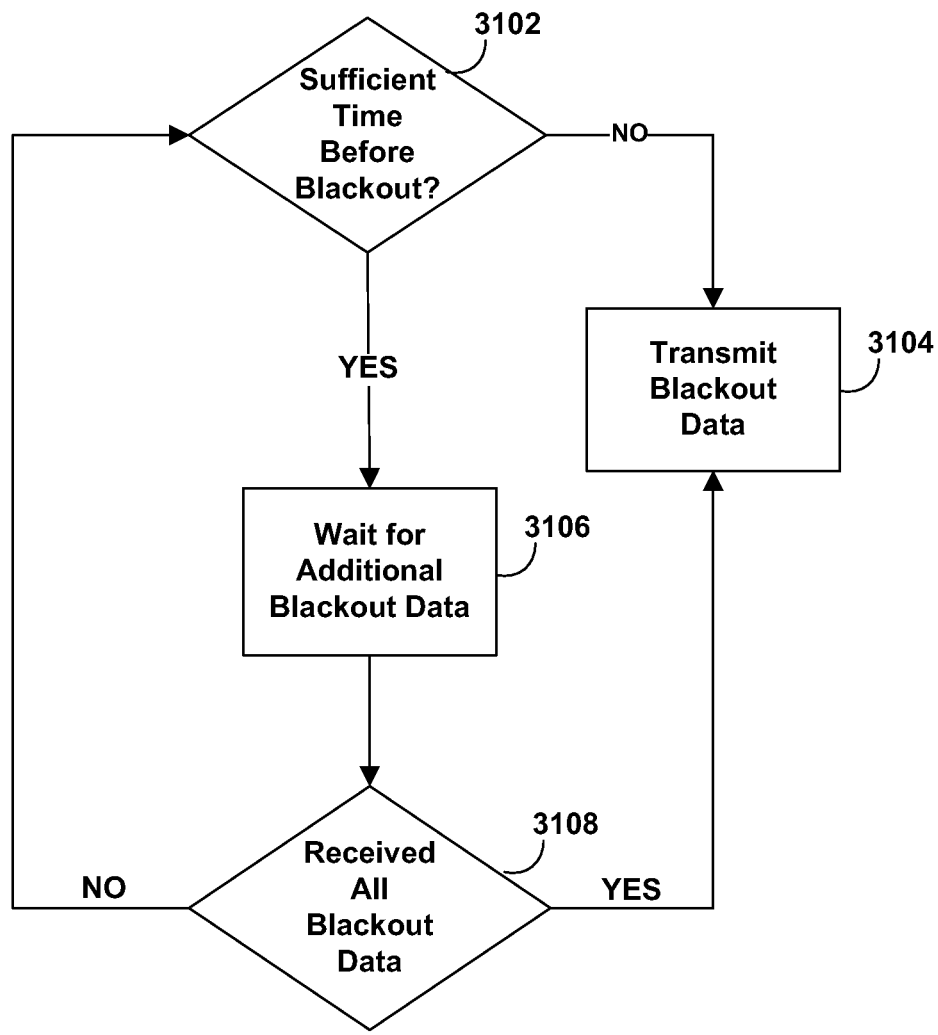
FIG. 31 is an illustrative flowchart describing a method for choosing an optimal method of blackout data transmission in accordance with one embodiment of the present invention.

Illustrative substeps of selecting an optimal transmission method 3006 in accordance with one embodiment of the present invention are shown in FIG. 31. At step 3102, the facilities or locations that transmit program guide blackout data (e.g., main facility 102 (FIG. 1), external information service 110 (FIG. 1), distribution facility 204 (FIGS. 2-6), Internet service system 302 (FIGS. 3, 4, and 6), an Internet source on Internet service system 302, server 502 (FIGS. 5-6) or any other facility or location that transmits program guide blackout data) may determine the amount of time that remains before a blackout is scheduled to occur. The facilities or locations that transmit blackout data may utilize the information from steps 3002 and 3004 of FIG. 30 to determine if there is sufficient time to transmit blackout data to various portions of the program guide, and to determine if in doing so, a user will be provided with enough notice of the blackout to avoid inconvenience that may result from inaccurate program listings (e.g., ordering a pay-per-view program when it is not available, setting a reminder for a blacked-out program, setting a record option for a blacked out program, etc.). It may be advantageous for a program guide user to receive all blackout data for a program at a given time. For example, incorporating all blackout data into a single schedule localization may provide for a complete set of options for a blacked-out program and allow a user to plan a viewing schedule accordingly. For example, when information display screens are generated by the program guide without complete blackout data, the user may be misinformed in much the same way inaccurate program listings misinform the user. Replacement media targeted to user viewing habits may be less likely to be seen by a user when replacement media data for a blacked-out program is provided by the program guide subsequent to other blackout data that indicates no replacement media is available. As another example, transmitting complete blackout data may reduce the number of necessary transmissions and may reduce system traffic. For example, in a client-server arrangement, such as the client-server arrangements of FIGS. 5-6, a program guide server (e.g, server 502) may periodically transmit blackout data to a client (e.g., user television equipment 204 (FIGS. 5-6, and 8-9)). If complete blackout information is transmitted in a single transmission, subsequent transmissions which may occupy valuable bandwidth in a client-server communications path may be avoided.

If insufficient time remains before a blackout is scheduled to occur (e.g., waiting for complete blackout data would provide a likelihood that a user will be inconvenienced), the facilities or locations that transmit blackout data may transmit the blackout data that is currently available at step 3104. If sufficient time remains before a blackout is scheduled to occur, the facilities or locations that transmit blackout data may delay blackout data transmission and wait for additional blackout data at step 3106. For example, a sports team front office (e.g., external information service 110 (FIG. 1)) may provide main facility 102 (FIG. 1) with venue protection blackout data indicating the date, time, and channel of a venue protection blackout, and may indicate that replacement media for a program will follow shortly. Main facility 102 may assign a cutoff date after which the initial blackout data, including the date, time, and channel of the blackout, will be transmitted to interactive application equipment 106 (FIGS. 1-7) with or without replacement media.

The facilities or locations that transmit blackout data may determine (e.g, continuously, daily, weekly, etc.) if complete blackout data has been received at step 3108. For example, main facility 102 (FIG. 1) may determine if the blackout data received from, for example, external information service 110 (FIG. 1) is sufficient for the program guide to provide desired blackout features (e.g., a description of the blacked-out program, ticket purchase information for a venue protection blackout, replacement media recommendations for the blacked-out program, automatic tuning to a local affiliate channel for an affiliate protection blackout, etc.). If complete blackout data has not been received, the program guide may then re-evaluate if sufficient time remains before a blackout at step 3102. If complete blackout data has been received, main facility 102 (FIG. 1), distribution facility 202 (FIGS. 2-6), server 502 (FIGS. 5-6), distribution facility 708 (FIG. 7), external information service 110 (FIG. 1) or other suitable facility or location may transmit the blackout data to various portions of the program guide system. As previously described, transmitting blackout data to and receiving blackout data with the program guide may not be necessary in instances in which the program guide generates blackout data. Particularly, when a program guide running on, for example, set-top box 804 (FIG. 8) generates blackout data the methods described in FIGS. 30-31 may not be utilized.

Figure 32:
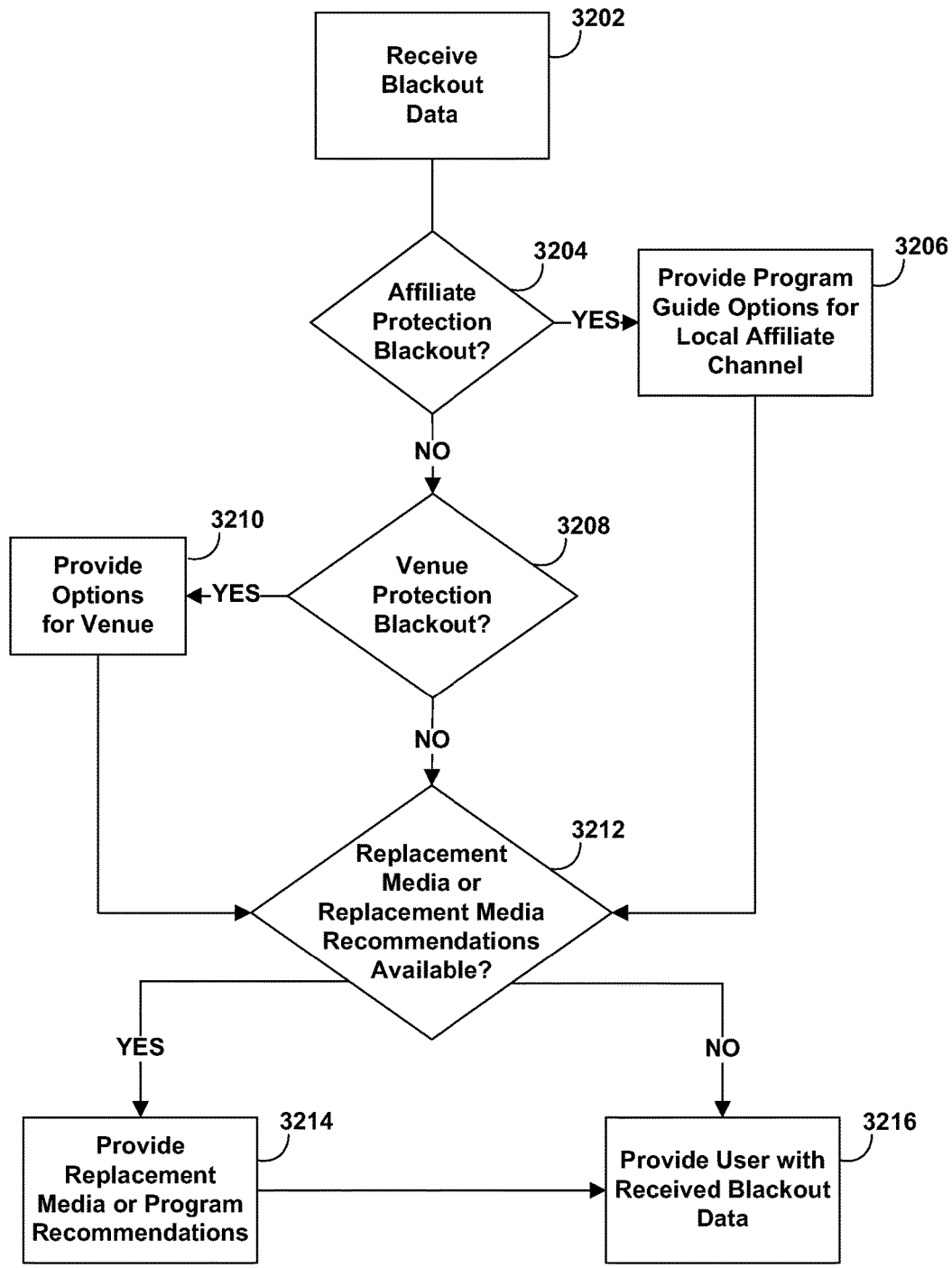
FIG. 32 is an illustrative flowchart describing a method of providing blackout features in interactive program guide display screens in accordance with one embodiment of the present invention.

FIG. 32 is an illustrative flowchart of a method for updating program guide display screens and providing blackout features. In the embodiment of FIG. 32, blackout data may be received (or generated) by the program guide at step 3202. For example, main facility 102 (FIG. 1) may receive blackout data from external information service 110 (FIG. 1). As another example, user television equipment 204 may receive blackout data from server 502 (FIGS. 5-6) in a client-server arrangement. Still another example, the program guide may notice a similarity in the program scheduling of a local affiliate and a national channel and generate affiliate protection blackout data. In the embodiment of FIG. 32, program guide options for a blacked-out program may at least partially specific to the blackout type of the blacked-out program. At step 3204, the program guide may determine if the blackout is an affiliate protection blackout. If the blackout is an affiliate protection blackout, the program guide may provide affiliate-protection-specific blackout options at step 3206. For example, the program guide may automatically tune to the local affiliate channel showing the blacked-out program when the program listing for the program on the national channel is selected. As another example, a reminder or record option for the affiliate channel program may automatically be set if the user had a reminder or record option set for the blacked-out program on the national channel. If the blackout is not an affiliate protection blackout, the program guide may determine if the blackout is a venue protection blackout at step 3208. If the blackout is a venue protection blackout, the program guide may provide venue-protection-specific blackout options at step 3210. For example, venue front office contacts and ticket purchase information for the venue that requested the blackout of its event may be provided in program guide screens. As another example, a link to an Internet venue website may be provided.

At step 3212, the program guide may determine if replacement media or replacement media recommendations may be provided, given the blackout data received at step 3202. For example, server 502 (FIGS. 5-6) may determine if a user viewing history correlates with potential replacement media (e.g., television programs that are in the same date and time slots). As another example, user television equipment 202 (FIGS. 2-6) or personal computer 702 (FIG. 7) may determine if replacement media associated with a blacked-out program is stored in a local storage device (e.g., secondary storage device (808, 908) or digital storage device (820, 906)). If replacement media or replacement media recommendations are not available, the program guide may provide the received blackout data at step 3216 (e.g., blackout type, blackout date, time, and channel, description of blacked-out program). If replacement media and/or replacement media recommendations are available, the program guide may provide replacement media and/or replacement media recommendations at step 3214. For example, user television equipment 204 (FIGS. 2-6, and 8-9) may selectively receive or tune to specific replacement media using communications device (812, 904) and display the replacement media when a user accesses the listing of a blacked-out program. As another example, the program guide may generate information display screens with targeted replacement media recommendations. At step 3216, the program guide may provide the user with the blackout data received at step 3202.

Figure 33:
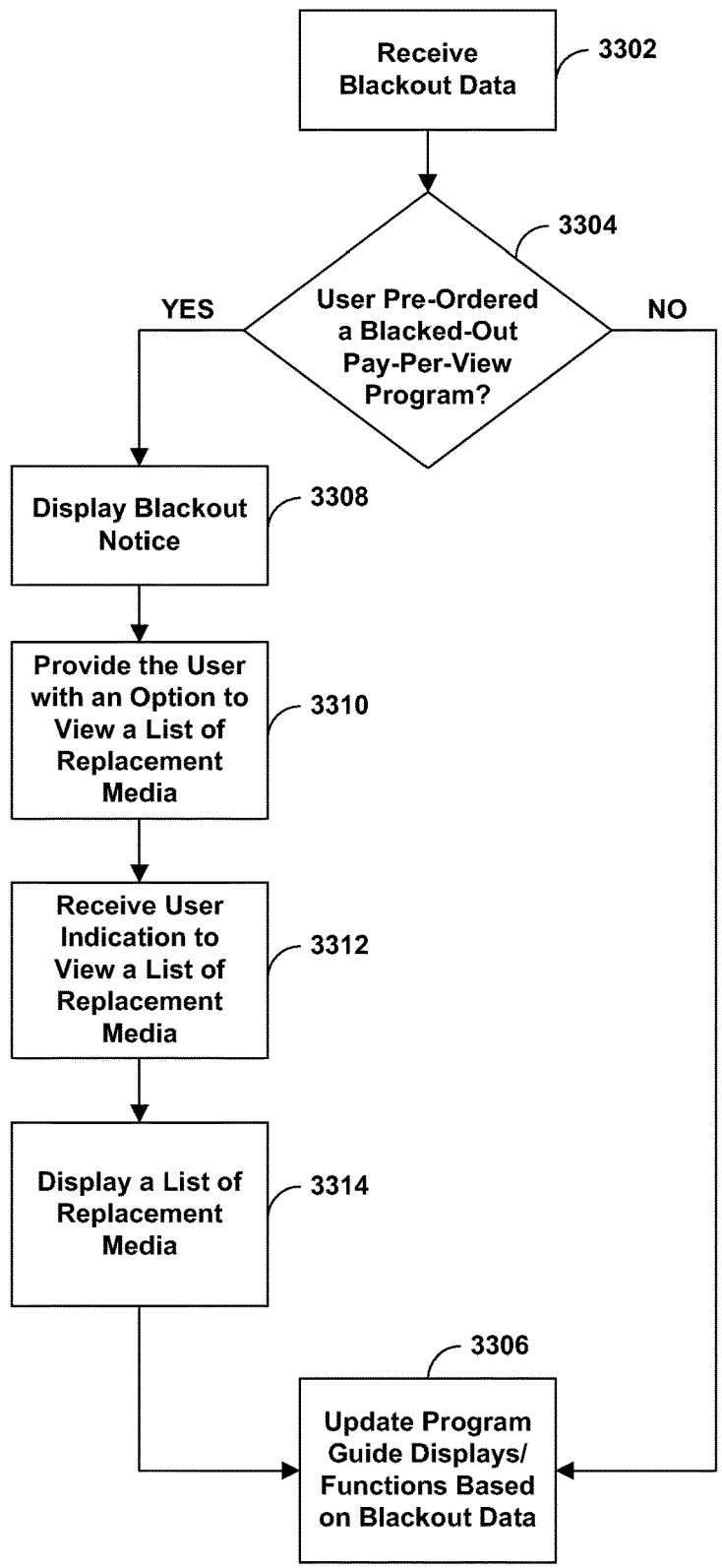
FIG. 33 is an illustrative flowchart describing a method of providing blackout features for pay-per-view programs in accordance with one embodiment of the present invention.

FIG. 33 shows an illustrative flowchart for providing blackout features for blacked-out pay-per-view programs in accordance with one embodiment of the present invention. At step 3302, pay-per-view program blackout data may be received by the program guide. For example, set-top box 804 (FIG. 8) may receive pay-per-view blackout data from distribution facility 202 (FIGS. 2-6), distribution facility 708 (FIG. 7), server 502 (FIGS. 5-6), Internet service system 302 (FIGS. 3, 4, and 6), or any other facility or location that may provide data that indicates the availability of pay-per-view programs. The program guide may then determine whether a user has pre-ordered a pay-per-view program that has subsequently been blacked out at step 3304. For example, in the client-server arrangements of FIGS. 5 and 6, server 502 may maintain a list of ordered pay-per-view programs and determine whether any of the programs in the list have been blacked out. As another example, a stand-alone program guide running on user televison equipment 204 (FIGS. 2-6, and 8-9) may continuously check a list of ordered pay-per-view programs for inclusion of blacked-out programs. If no blacked-out pay-per-view programs have been previously ordered by the user, the program guide may update program guide displays and functions based on the received blackout data at step 3306. For example, server 502 (FIGS. 5-6) may remove blacked-out pay-per-view programs from the list of available pay-per-view programs or provide a list of recommended replacement media when a negative purchase price has been associated with a pay-per-view program.

If blacked-out pay-per-view programs have been previously ordered by the user, the program guide may display a blackout notice at step 3308. For example, the program guide running user television equipment 204 (FIGS. 2-6, 8 and 9) may generate and display an overlay that informs the user of a pay-per-view program blackout and that provides blackout features. The program guide may provide the user with the option to view a list of recommended replacement media at step 3310. In response to user-selection of the option to view a list of replacement media at step 3312, the program guide may display a list of recommended replacement media 3314. The recommended replacement media may have similar program attributes as the blacked-out program, may be user-targeted, may be a different showing of the blacked-out program, or may be recommended by the program guide for any other suitable reason. In some embodiments, the program guide may automatically display a list of recommended replacement media when a pay-per-view program that has been previously ordered by the user is blacked out. The user may then, as previously described, update program guide displays and functions at step 3306.

Figure 34:
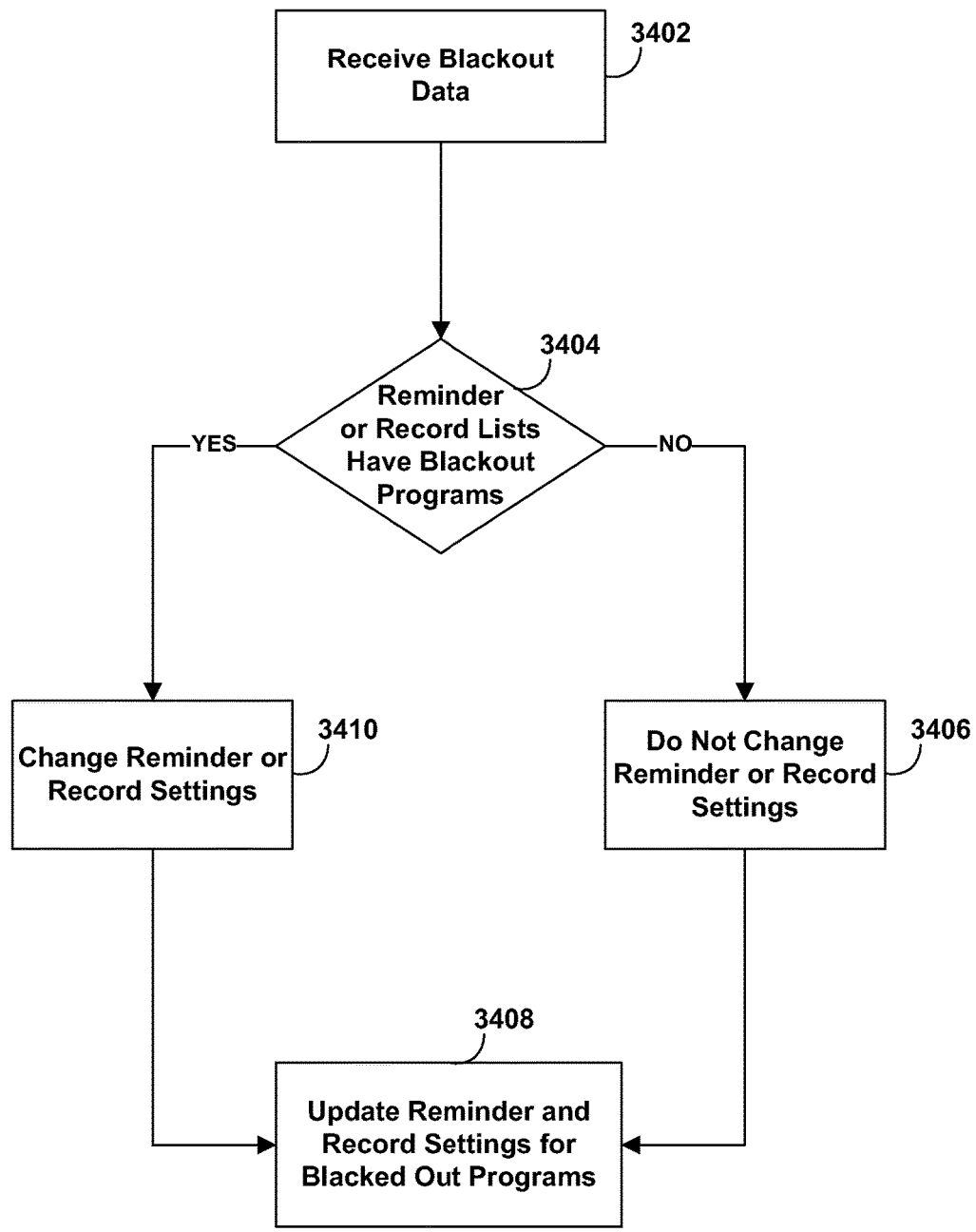
FIG. 34 is an illustrative flowchart describing a method of changing reminder and record features for blacked-out programs in accordance with one embodiment of the present invention.

FIG. 34 shows an illustrative flowchart for updating reminder and record lists in response to blackouts in accordance with one embodiment of the present invention. At step, 3402 blackout data may be received by the program guide. For example, set-top box 804 (FIG. 8) may receive blackout data from distribution facility 202 (FIGS. 2-6), distribution facility 708 (FIG. 7), server 502 (FIGS. 5-6), main facility 102 (FIG. 1), external information service 110 (FIG. 1), Internet service system 302 (FIGS. 3,4, and 6). The program guide may then check reminder and record lists for blacked-out programs at step 3404. For example, server 502 may maintain the reminder and record lists in the client-server arrangements of FIGS. 5 and 6 and may check if any of the programs in the lists have been blacked out. As another example, a stand-alone program guide running on user televison equipment 202 (FIGS. 2-6, and 8-9) may continuously check reminder and record lists for inclusion of blacked-out programs. At step 3406, if no programs in the reminder or record lists are blacked-out programs, no change to the reminder and record settings may be made. At step 3408, reminder and record settings may then be disabled for all blacked-out programs such that a user does not subsequently set the options for blacked-out programs. If the reminder or record lists include blacked-out programs, the lists may be changed to prevent the reminding for and recording of blacked-out programs at step 3410. For example, the program guide may automatically remove the blacked-out program from the remind or record list, and may set a record or remind option for replacement media.

Reminder and record settings may then be disabled for all blacked-out programs such that a user cannot subsequently set the options at step 3408.

In some embodiments, step 3410 and step 3406 may be logically be the same step. For example, in a program guide running on user television equipment 204 (FIGS. 1-4, and 8-9), server 502 (FIGS. 5-6), or other program guide equipment, reminder and record lists may constitute lists of identifiers or pointers which indicate or "point to" particular programs, such that changes to the programs automatically constitute changes in the lists.

Figure 35:
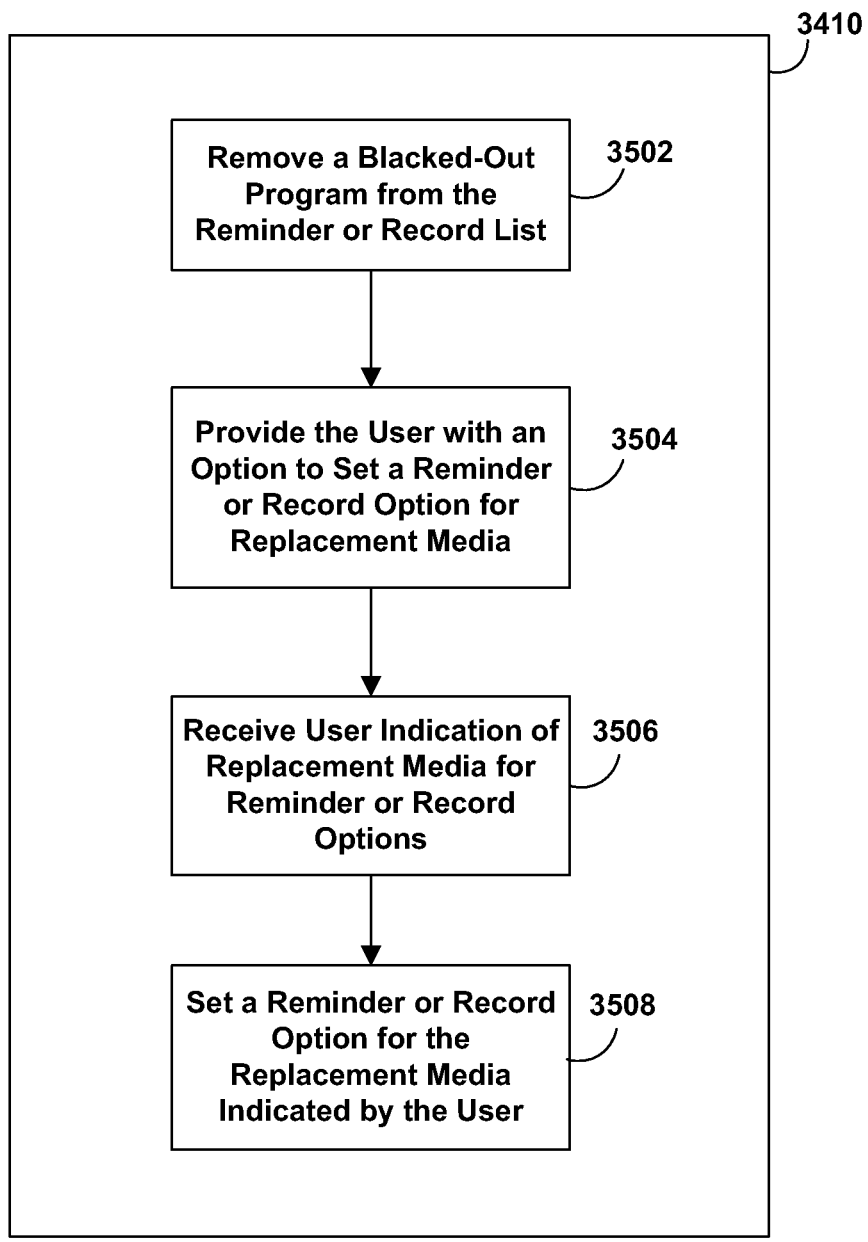
FIGS. 35-36 are illustrative flowcharts describing methods of changing reminder and record settings as a result of a blackout in accordance with one embodiment of the present invention.

FIG. 35 shows illustrative substeps for step 3410 (FIG. 34). At step 3502, a blacked-out program may be removed from the reminder or record lists. At step 3504, the interactive program guide may provide the user with the option to set a reminder or record option for replacement media. For example, a list of user-selectable, targeted replacement media recommendations may be displayed in program guide information screens. Upon receipt of user selection of replacement media at step 3506, the interactive program guide may add the replacement media to the reminder or record list 3508.

Figure 36:
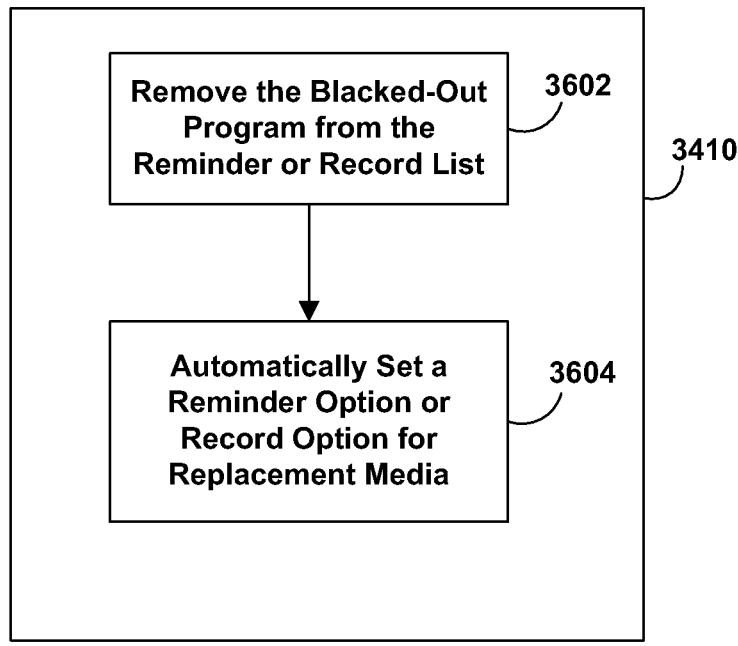

In some embodiments, the interactive program guide may automatically replace a blacked-out program in the reminder or record list with replacement media. Turning to FIG. 36, another embodiment of step 3410 (FIG. 34) is shown. At step 3602, the program guide may remove a blacked-out program from the reminder or record lists. The interactive program guide may automatically set a reminder option or a record option for replacement media at step 3604. For example, the interactive program guide may automatically set a reminder or record option for replacement media with similar program attributes as the blacked-out program removed from the reminder or record list. As another example, the program guide may automatically set a reminder or record option for a program that has similar attributes as a user viewing history that is maintained by the program guide when a program on the reminder or record list is blacked out. As another example, the program guide may automatically set a reminder for replacement media that is a different showing (i.e., available on a different channel or at a different time) of the blacked-out program.

Thus, an interactive program guide with blackout support and features is provided. Persons skilled in the art will appreciate that the present invention can be practiced by other than the described embodiments, which are presented for purposes of illustration rather than of limitation, and the present invention is limited only by the claims that follow.

What is claimed is:

1. A method for supporting programming blackouts, the method comprising:
receiving a user selection of a program indicator;
receiving data indicating that a program corresponding to the program indicator is a blacked-out program;
determining, based on the data, a type of blackout associated with the blacked-out program;
in response to determining that the type of blackout associated with the blacked-out program is a first type of blackout:
determining an alternate source for the blacked-out program;
generating for display a notification indicating that the program corresponding to the program indicator is a blacked-out program, the notification including a selectable option to access the alternate source for the blacked-out program; and
in response to receiving a user selection of the selectable option, accessing the alternate source for the blacked-out program; and
in response to determining that the type of blackout is a second type of blackout:
determining, based on data indicating an attribute of the blacked-out program, one or more other programs having an attribute corresponding to the attribute of the blacked-out program;
generating a recommendation of the one or more other programs; and
generating for display a selectable option corresponding to the recommendation.

2. The method of claim 1, further comprising:
receiving a selection, from the user, of the selectable option corresponding to the recommendation; and
in response to receiving the selection of the selectable option, generating for display the one or more other programs corresponding to the recommendation.

3. The method of claim 1 wherein the attribute of the blacked-out program is selected from a group consisting of a program title, a program genre, an actor, and a director.

4. The method of claim 1, further comprising:
maintaining a user viewing history for at least one user,
wherein determining the one or more other programs having an attribute corresponding to the attribute of the blacked-out program further comprises determining one or more other programs having an attribute corresponding to an attribute of programs in the user viewing history.

5. The method of claim 1, further comprising:
identifying a different showing of the blacked-out program, wherein the different showing is at a different time than the blacked-out program; and
generating for display a notification indicating the different showing of the blacked-out program.

6. The method of claim 1, wherein the first type of blackout is an affiliate protection blackout and the second type of blackout is a venue protection blackout,
wherein the affiliate protection blackout is a blackout that occurs when a program, which is scheduled to be broadcast on a national channel and a local channel, is blacked out on the national channel, and
wherein a venue protection blackout is a blackout that occurs when a program including a broadcast of a live event is blacked out when a venue of the live event is not sold out.

7. The method of claim 1, wherein the one or more other programs include a targeted advertisement.

8. The method of claim 7, further comprising selecting the targeted advertisement based on the attribute of the blacked-out program.

9. The method of claim 7, further comprising selecting the targeted advertisement based on a preference of a user.

10. The method of claim 1, wherein the one or more other programs include ticket purchase information.

11. A system for supporting programming blackouts, the system comprising:
control circuitry configured to:
receive a user selection of a program indicator;
receive data indicating that a program corresponding to the program indicator is a blacked-out program;
determine, based on the data, a type of blackout associated with the blacked-out program;
in response to determining that the type of blackout associated with the blacked-out program is a first type of blackout:

determine an alternate source for the blacked-out program;

generate for display a notification indicating that the program corresponding to the program indicator is a blacked-out program, the notification including a selectable option to access the alternate source for the blacked-out program; and in response to receiving a user selection of the selectable option, accessing the alternate source for the blacked-out program; and in response to determining that the type of blackout is a second type of blackout:

determine, based on data indicating an attribute of the blacked-out program, one or more other programs having an attribute corresponding to the attribute of the blacked-out program;

generate a recommendation of the one or more other programs; and generate for display a selectable option corresponding to the recommendation.

12. The system of claim 11, wherein the control circuitry is further configured to:

receive a selection, from the user, of the selectable option corresponding to the recommendation; and in response to receiving the selection of the selectable option, generate for display the one or more other programs corresponding to the recommendation.

13. The system of claim 11 wherein the attribute of the blacked-out program is selected from a group consisting of a program title, a program genre, an actor, and a director.

14. The system of claim 11, wherein the control circuitry is further configured to:

maintain a user viewing history for at least one user, wherein, when determining the one or more other programs having an attribute corresponding to the attribute of the blacked-out program, the control circuitry is further configured to determine one or more other programs having an attribute corresponding to an attribute of programs in the user viewing history.

15. The system of claim 11, wherein the control circuitry is further configured to:

identify a different showing of the blacked-out program, wherein the different showing is at a different time than the blacked-out program; and generate for display a notification indicating the different showing of the blacked-out program.

16. The system of claim 11, wherein the first type of blackout is an affiliate protection blackout and the second type of blackout is a venue protection blackout, wherein the affiliate protection blackout is a blackout that occurs when a program, which is scheduled to be broadcast on a national channel and a local channel, is blacked out on the national channel, and wherein a venue protection blackout is a blackout that occurs when a program including a broadcast of a live event is blacked out when a venue of the live event is not sold out.

17. The system of claim 11, wherein the one or more other programs include a targeted advertisement.

18. The system of claim 17, wherein the control circuitry is further configured to select the targeted advertisement based on the attribute of the blacked-out program.

19. The system of claim 17, wherein the control circuitry is further configured to select the targeted advertisement based on a preference of a user.

20. The system of claim 11, wherein the one or more other programs include ticket purchase information.

* * * * *